(12) United States Patent
Marschall et al.

(10) Patent No.: US 8,818,884 B2
(45) Date of Patent: Aug. 26, 2014

(54) ARCHITECTURAL DESIGN FOR CUSTOMER RETURNS HANDLING APPLICATION SOFTWARE

(75) Inventors: Peer Marschall, Heidelberg (DE);
Anoop Kulkarni, Bangalore (IN);
Thomas Bach, Muehlhausen (DE);
Alexander Koegler, Walldorf (DE);
Thomas Nitschke, Nussloch (DE);
Andrea Sudbrack, Heidelberg (DE);
Jochen Hirth, Weinheim (DE); Stephan Hetzer, Oestringen-Eichelberg (DE);
Holger Herrmann, Malsch (DE); Renzo Colle, Stutensee (DE); Daniel Bock, Dossenheim (DE); Thomas Breitling, Edingen-Neckarhausen (DE)

(73) Assignee: SAP AG, Walldorf (DE)

( * ) Notice: Subject to any disclaimer, the term of this patent is extended or adjusted under 35 U.S.C. 154(b) by 1290 days.

(21) Appl. No.: 12/233,458

(22) Filed: Sep. 18, 2008

(65) Prior Publication Data
US 2010/0070330 A1 Mar. 18, 2010

(51) Int. Cl.
*G06Q 10/00* (2012.01)
(52) U.S. Cl.
USPC .......................................................... 705/28
(58) Field of Classification Search
USPC .................................................. 705/28, 348
See application file for complete search history.

(56) References Cited

U.S. PATENT DOCUMENTS

| | | | |
|---|---|---|---|
| 4,947,321 A | 8/1990 | Spence et al. | |
| 5,361,198 A | 11/1994 | Harmon et al. | |
| 5,550,734 A | 8/1996 | Tarter et al. | |
| 5,560,005 A | 9/1996 | Hoover et al. | |
| 5,566,097 A | 10/1996 | Myers et al. | |
| 5,586,312 A | 12/1996 | Johnson et al. | |
| 5,590,277 A | 12/1996 | Fuchs et al. | |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |

(Continued)

FOREIGN PATENT DOCUMENTS

| | | |
|---|---|---|
| WO | 00/23874 | 4/2000 |
| WO | 2000/023874 | 4/2000 |
| WO | WO 2004/083984 | 9/2004 |
| WO | WO 2005/114381 | 12/2005 |

OTHER PUBLICATIONS

Chen et al, "Web Services Enabled Procurement in the Extended Enterprise: An Architectural Design and Implementation." Journal of Electronic Commerce Research, vol. 4, No. 4, 2003.*

(Continued)

*Primary Examiner* — Allen J Jung
(74) *Attorney, Agent, or Firm* — Fish & Richardson P.C.

(57) ABSTRACT

Methods, systems, and apparatus, including computer program products, for implementing a software architecture design for a software application implementing customer returns handling. The application is structured as multiple process components interacting with each other through service interfaces, and multiple service operations, each being implemented for a respective process component. The process components include an Accounting process component, a Customer Return Processing process component, a Sales Order Processing process component, a Customer Invoice Processing process component, a Due Item Processing process component, a Balance of Foreign Payment Management process component, a Payment Processing process component, a Supply and Demand Matching process component, an Inventory Processing process component, a Site Logistics Processing process component, and an Inbound Delivery Processing process component.

22 Claims, 22 Drawing Sheets

(56) References Cited

U.S. PATENT DOCUMENTS

| | | | |
|---|---|---|---|
| 5,710,917 | A | 1/1998 | Musa et al. |
| 5,768,119 | A | 6/1998 | Havekost et al. |
| 5,822,585 | A | 10/1998 | Nobel et al. |
| 5,832,218 | A | 11/1998 | Gibbs et al. |
| 5,848,291 | A | 12/1998 | Milne et al. |
| 5,867,495 | A | 2/1999 | Elliott et al. |
| 5,870,588 | A | 2/1999 | Rompaey et al. |
| 5,881,230 | A | 3/1999 | Christensen et al. |
| 5,893,106 | A | 4/1999 | Brobst et al. |
| 5,898,872 | A | 4/1999 | Richley |
| 5,918,219 | A | 6/1999 | Isherwood |
| 5,987,247 | A | 11/1999 | Lau |
| 5,991,536 | A | 11/1999 | Brodsky et al. |
| H1830 | H | 1/2000 | Petrimoulx et al. |
| 6,028,997 | A | 2/2000 | Leymann et al. |
| 6,038,393 | A | 3/2000 | Iyengar et al. |
| 6,049,838 | A | 4/2000 | Miller et al. |
| 6,067,559 | A | 5/2000 | Allard et al. |
| 6,070,197 | A | 5/2000 | Cobb et al. |
| 6,112,024 | A | 8/2000 | Almond et al. |
| 6,151,582 | A | 11/2000 | Huang et al. |
| 6,167,563 | A | 12/2000 | Fontana et al. |
| 6,167,564 | A | 12/2000 | Fontana et al. |
| 6,177,932 | B1 | 1/2001 | Galdes et al. |
| 6,182,133 | B1 | 1/2001 | Horvitz |
| 6,192,390 | B1 | 2/2001 | Berger et al. |
| 6,208,345 | B1 | 3/2001 | Sheard et al. |
| 6,237,136 | B1 | 5/2001 | Sadahiro |
| 6,272,672 | B1 | 8/2001 | Conway |
| 6,311,170 | B1 | 10/2001 | Embrey |
| 6,338,097 | B1 | 1/2002 | Krenzke et al. |
| 6,424,991 | B1 | 7/2002 | Gish |
| 6,434,740 | B1 | 8/2002 | Monday et al. |
| 6,442,748 | B1 | 8/2002 | Bowman-Amuah |
| 6,445,782 | B1 | 9/2002 | Elfe et al. |
| 6,446,045 | B1 | 9/2002 | Stone et al. |
| 6,446,092 | B1 | 9/2002 | Sutter |
| 6,473,794 | B1 | 10/2002 | Guheen et al. |
| 6,493,716 | B1 | 12/2002 | Azagury et al. |
| 6,571,220 | B1 | 5/2003 | Ogino et al. |
| 6,594,535 | B1 | 7/2003 | Costanza |
| 6,601,233 | B1 | 7/2003 | Underwood |
| 6,601,234 | B1 | 7/2003 | Bowman-Amuah |
| 6,606,744 | B1 | 8/2003 | Mikurak |
| 6,609,100 | B2 | 8/2003 | Smith et al. |
| 6,640,238 | B1 | 10/2003 | Bowman-Amuah |
| 6,671,673 | B1 | 12/2003 | Baseman et al. |
| 6,678,882 | B1 | 1/2004 | Hurley et al. |
| 6,687,734 | B1 | 2/2004 | Sellink et al. |
| 6,691,151 | B1 | 2/2004 | Cheyer et al. |
| 6,721,783 | B1 | 4/2004 | Blossman et al. |
| 6,738,964 | B1 | 5/2004 | Zink et al. |
| 6,747,679 | B1 | 6/2004 | Finch et al. |
| 6,750,885 | B1 | 6/2004 | Finch et al. |
| 6,757,837 | B1 | 6/2004 | Platt et al. |
| 6,764,009 | B2 | 7/2004 | Melick et al. |
| 6,772,216 | B1 | 8/2004 | Ankireddipally et al. |
| 6,782,536 | B2 | 8/2004 | Moore et al. |
| 6,789,252 | B1 | 9/2004 | Burke et al. |
| 6,845,499 | B2 | 1/2005 | Srivastava et al. |
| 6,847,854 | B2 | 1/2005 | Discenzo |
| 6,859,931 | B1 | 2/2005 | Cheyer et al. |
| 6,889,197 | B2 | 5/2005 | Lidow |
| 6,889,375 | B1 | 5/2005 | Chan et al. |
| 6,895,438 | B1 | 5/2005 | Ulrich |
| 6,898,783 | B1 | 5/2005 | Gupta et al. |
| 6,904,399 | B2 | 6/2005 | Cooper et al. |
| 6,907,395 | B1 | 6/2005 | Hunt et al. |
| 6,954,736 | B2 | 10/2005 | Menninger et al. |
| 6,985,939 | B2 | 1/2006 | Fletcher et al. |
| 6,990,466 | B1 | 1/2006 | Hu |
| 7,003,474 | B2 | 2/2006 | Lidow |
| 7,031,998 | B2 | 4/2006 | Archbold |
| 7,043,448 | B2 | 5/2006 | Campbell |
| 7,047,518 | B2 | 5/2006 | Little et al. |
| 7,050,056 | B2 | 5/2006 | Meyringer |
| 7,050,873 | B1 | 5/2006 | Discenzo |
| 7,055,136 | B2 | 5/2006 | Dzoba et al. |
| 7,058,587 | B1 | 6/2006 | Horne |
| 7,069,536 | B2 | 6/2006 | Yaung |
| 7,072,855 | B1 | 7/2006 | Godlewski et al. |
| 7,076,766 | B2 | 7/2006 | Wirts et al. |
| 7,100,195 | B1 | 8/2006 | Underwood |
| 7,103,873 | B2 | 9/2006 | Tanner et al. |
| 7,117,447 | B2 | 10/2006 | Cobb et al. |
| 7,120,597 | B1 | 10/2006 | Knudtzon et al. |
| 7,120,896 | B2 | 10/2006 | Budhiraja et al. |
| 7,131,069 | B1 | 10/2006 | Rush et al. |
| 7,149,887 | B2 | 12/2006 | Morrison et al. |
| 7,155,403 | B2 | 12/2006 | Cirulli et al. |
| 7,155,409 | B1 | 12/2006 | Stroh |
| 7,181,694 | B2 | 2/2007 | Reiss et al. |
| 7,184,964 | B2 | 2/2007 | Wang |
| 7,194,431 | B1 * | 3/2007 | Land et al. ............... 705/30 |
| 7,197,740 | B2 | 3/2007 | Beringer et al. |
| 7,200,569 | B2 | 4/2007 | Gallagher et al. |
| 7,206,768 | B1 | 4/2007 | deGroeve et al. |
| 7,213,232 | B1 | 5/2007 | Knowles |
| 7,216,091 | B1 | 5/2007 | Blandina et al. |
| 7,219,107 | B2 | 5/2007 | Beringer |
| 7,222,786 | B2 | 5/2007 | Renz et al. |
| 7,225,240 | B1 | 5/2007 | Fox et al. |
| 7,249,044 | B2 | 7/2007 | Kumar et al. |
| 7,257,254 | B2 | 8/2007 | Tunney |
| 7,283,973 | B1 | 10/2007 | Loghmani et al. |
| 7,293,254 | B2 | 11/2007 | Bloesch et al. |
| 7,299,970 | B1 | 11/2007 | Ching |
| 7,315,830 | B1 | 1/2008 | Wirtz et al. |
| 7,322,024 | B2 | 1/2008 | Carlson et al. |
| 7,324,966 | B2 | 1/2008 | Scheer |
| 7,353,180 | B1 | 4/2008 | Silverstone et al. |
| 7,356,492 | B2 | 4/2008 | Hazi et al. |
| 7,367,011 | B2 | 4/2008 | Ramsey et al. |
| 7,370,315 | B1 | 5/2008 | Lovell et al. |
| 7,376,601 | B1 | 5/2008 | Aldridge |
| 7,376,604 | B1 | 5/2008 | Butcher |
| 7,376,632 | B1 | 5/2008 | Sadek et al. |
| 7,383,201 | B2 | 6/2008 | Matsuzaki et al. |
| 7,386,833 | B2 | 6/2008 | Granny et al. |
| 7,406,716 | B2 | 7/2008 | Kanamori et al. |
| 7,415,697 | B1 | 8/2008 | Houlding |
| 7,418,409 | B1 | 8/2008 | Goel |
| 7,418,424 | B2 | 8/2008 | Martin et al. |
| 7,424,701 | B2 | 9/2008 | Kendall et al. |
| 7,433,979 | B2 | 10/2008 | Need |
| 7,448,022 | B1 | 11/2008 | Ram et al. |
| 7,451,432 | B2 | 11/2008 | Shukla et al. |
| 7,460,654 | B1 | 12/2008 | Jenkins et al. |
| 7,461,030 | B2 | 12/2008 | Hibler et al. |
| 7,469,233 | B2 | 12/2008 | Shooks et al. |
| 7,516,088 | B2 | 4/2009 | Johnson et al. |
| 7,523,054 | B2 | 4/2009 | Tyson-Quah |
| 7,529,699 | B2 | 5/2009 | Fuse et al. |
| 7,536,325 | B2 | 5/2009 | Randell et al. |
| 7,536,354 | B1 | 5/2009 | deGroeve et al. |
| 7,546,520 | B2 | 6/2009 | Davidson et al. |
| 7,546,575 | B1 | 6/2009 | Dillman et al. |
| 7,565,640 | B2 | 7/2009 | Shukla et al. |
| 7,574,694 | B2 | 8/2009 | Mangan et al. |
| 7,624,371 | B2 | 11/2009 | Kulkarni et al. |
| 7,631,291 | B2 | 12/2009 | Shukla et al. |
| 7,640,195 | B2 | 12/2009 | Von Zimmermann et al. |
| 7,640,291 | B2 | 12/2009 | Maturana et al. |
| 7,644,390 | B2 | 1/2010 | Khodabandehloo et al. |
| 7,657,406 | B2 | 2/2010 | Tolone et al. |
| 7,657,445 | B1 | 2/2010 | Goux |
| 7,665,083 | B2 | 2/2010 | Demant et al. |
| 7,668,761 | B2 | 2/2010 | Jenkins et al. |
| 7,672,888 | B2 | 3/2010 | Allin et al. |
| 7,681,176 | B2 | 3/2010 | Wills et al. |
| 7,693,586 | B2 | 4/2010 | Dumas et al. |
| 7,703,073 | B2 | 4/2010 | Illowsky et al. |
| 7,739,160 | B1 | 6/2010 | Ryan et al. |
| 7,742,985 | B1 | 6/2010 | Digrigoli et al. |

(56) References Cited

U.S. PATENT DOCUMENTS

| | | |
|---|---|---|
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1* | 7/2007 | Berger et al. .............. 705/7 |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |

(56) References Cited

U.S. PATENT DOCUMENTS

| | | |
|---|---|---|
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233545 A1 | 10/2007 | Cala et al. |
| 2007/0233574 A1 | 10/2007 | Koegler et al. |
| 2007/0233575 A1 | 10/2007 | Berger et al. |
| 2007/0233581 A1 | 10/2007 | Peter |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265860 A1 | 11/2007 | Herrmann et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2008/0263152 A1 | 10/2008 | Daniels et al. |
| 2008/0300959 A1 | 12/2008 | Sinha et al. |
| 2009/0037287 A1 | 2/2009 | Baitalmal et al. |
| 2009/0037492 A1 | 2/2009 | Baitalmal et al. |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070391 A1 | 3/2010 | Storr et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

OTHER PUBLICATIONS

Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports™ 13,000 MAS 90® for Windows® Shipments in First Nine Months of Availability"; PR Newswire; Apr. 28, 1997.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyer's Guide to Software for Purchasing 2000.(Directory)"; Purchasing, vol. 129, No. 1; p. 179; Jul. 13, 2000.

"Hudson's Bay Company Realizes Fast ROI with the Oracle E-Business Suite"; PR Newswire; New York; Jan. 15, 2002; p. 1.

International Preliminary Report on Patentability issued in International Application No. PCT/EP2007/002835; Sep. 30, 2008; 8 pages.

Office Action issued in U.S. Appl. No. 11/397,029; Jul. 21, 2009;28 pages.

Office Action issued in U.S. Appl. No. 11/323,040; Jul. 24, 2009; 35 pages.

Office Action issued in U.S. Appl. No. 11/323,590; Jul. 10, 2009; 32 pages.

Office Action issued in U.S. Appl. No. 11/322,816; Jul. 23, 2006; 41 pages.

Office Action issued in U.S. Appl. No. 11/322,851; Sep. 2, 2009; 32 pages.

Office Action issued in U.S. Appl. No. 11/323,590; Dec. 30, 2009; 31 pages.

Office Action issued in U.S. Appl. No. 11/322,482; Jan. 7, 2010; 19 pages.

Office Action issued in U.S. Appl. No. 11/322,772; Dec. 9, 2009; 14 pages.

Office Action issued in U.S. Appl. No. 11/323,039; Sep. 4, 2009; 36 pages.

Office Action issued in U.S. Appl. No. 11/323,634; Sep. 10, 2009; 15 pages.

Office Action issued in U.S. Appl. No. 11/322,383; Nov. 12, 2009; 29 pages.

Office Action issued in U.S. Appl. No. 11/396,258; Nov. 25, 2009; 9 pages.

Office Action issued in U.S. Appl. No. 12/333,085; Jun. 25, 2009; 9 pages.

Office Action issued in U.S. Appl. No. 11/396,288; Aug. 19, 2009; 20 pages.

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

(56) References Cited

OTHER PUBLICATIONS

Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Lockamy III, et al.; "Linking SCOR Planning Practices to Supply Chain Performance"; International Journal of Operationgs & Production Management; vol. 24, No. 12; pp. 1192-1218.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.

(56) References Cited

OTHER PUBLICATIONS

Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; 2004; pp. 1-208.
SAP AG; "Powered by SAP NetWeaver Partner Program—Frequently Asked Questions"; May 2005; 10 pages. [online] http://www.lionbridge.com/NR/rdonlyres/4940BE1F/DA46/412E/AB16/F049BD865CA1/0/PBMWFAQ_50070686_en.pdf.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,236 on Oct. 28, 2010; 19 pages.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Notice of Allowance issued in U.S. Appl. No. 11/322,482; Jul. 13, 2010; 5 pages.
Office Action issued in U.S. Appl. No. 11/323,634 on Apr. 29, 2011; 8 pages.
Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Office Action issued in U.S. Appl. No. 11/404,147 on Aug. 4, 2011; 26 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 11/967,483 on Aug. 20, 2010; 10 pages.
Office Action issued in U.S. Appl. No. 11/967,483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/333,085; Sep. 13, 2010; 8 pages.
Office Action issued in U.S. Appl. No. 12/233,087 on Aug. 18, 2011; 42 pages.
Office Action issued in U.S. Appl. No. 11/396,312 on Sep. 10, 2010; 23 pages.
Office Action issued in U.S. Appl. No. 11/322,611 on Sep. 16, 2010; 21 pages.
Office Action issued in U.S. Appl. No. 11/322,772; Jul. 12, 2010; 18 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Jul. 23, 2010; 38 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowance issued in U.S. Appl. No. 11/396,259 on Jul. 6, 2010; 6 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Office Action issued in U.S. Appl. No. 11/322,845; Jul. 15, 2010; 16 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.

(56) References Cited

OTHER PUBLICATIONS

Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Kremic, Tibor; "Outsourcing Decision Support: A Survey of Benefits, Risks, and Decision Factor"; Supply Chain Management; V. 11; 2006; pp. 467-482.
Sarjoughian et al.; "CoSMOs: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Office Action issued in U.S. Appl. No. 12/327,701 on Nov. 8, 2011; 20 pages.
Notice of Allowanced issued in U.S. Appl. No. 11/322,398 on Oct. 18, 2011; 7 pages.
Office Action issued in U.S. Appl. No. 11/396,288 on Oct. 17, 2011; 38 pages.
Examiner's Answer to Appeal Brief issued in U.S. Appl. No. 11/396,236 on Nov. 10, 2011; 19 pages.
Notice of Allowance issued in U.S. Appl. No. 11/396,250 on Dec. 7, 2011; 6 pages.
Office Action issued in U.S. Appl. No. 11/396,252 on Nov. 10, 2011; 18 pages.
Notice of Allowance issued in U.S. Appl. No. 11/322,845; Nov. 13, 2011; 9 pages.
Office Action issued in U.S. Appl. No. 11/397,026; Jul. 21, 2009; 28 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Notice of Allowance issued in U.S. Appl. No. 11/968,054 on Aug. 2, 2011; 5 pages.
Office Action issued in U.S. Appl. No. 11/967,489 on Sep. 28, 2011; 7 pages.
Notice of Allowance issued in U.S. Appl. No. 11/967,393 on Nov. 9, 2011; 9 pages.
"IDe Partners with Journyx to Offer Customers Best-in-Class Time Management Solution"; PR Newswire; Mar. 8, 2005; Business Dateline.
Meseroll, Robert; "Data Mining Navy Flight"; IEEE Autotestcom 2007; Sep. 2007; pp. 476-481.
"Trakware Systems Inc. Expands Management Team: Leading To-Order Software Provider Adds Experienced Global Vp Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Office Action issued in U.S. Appl. No. 11/322,816; Jul. 23, 2009; 41 pages.
Office Action issued in U.S. Appl. No. 12/233,479 on May 7, 2012; 26 pages.
Notice of Allowance issued in U.S. Appl. No. 12/332,965 on Jun. 11, 2012; 21 pages.
Notice of Allowance in U,S. Appl. No. 12/233,462 on Apr. 5, 2012; 7 pages.
Notice of Allowance issued in U.S. Appl. No. 12/233,289 on Feb. 15, 2012; 11 pages.
Notice of Allowance issued in U.S. Appl. No. 12/327,590 on Dec. 28, 2011; 10 pages.
Notice of Allowance issued in U.S. Appl. No. 12/327,701 on Apr. 6, 2012; 9 pages.
Notice of Allowance issued in U.S. Appl. No. 12/233,087 on Mar. 30, 2012; 30 pages.
Notice of Allowance issued in U.S. Appl. No. 12/233,534 won Dec. 28, 2011; 7 pages.
Notice of Allowance issued in U.S. Appl. No. 11/396,259 on Mar. 15, 2012; 7 pages.
Notice of Allowance issued in U.S. Appl. No. 11/396,258 on Feb. 3, 2012; 12 pages.

(56) References Cited

OTHER PUBLICATIONS

Notice of Allowance issued in U.S. Appl. No. 11/322,851 on Mar. 1, 2012; 9 pages.
Notice of Allowance issued in U.S. Appl. No. 11/397,026 on Feb. 23, 2012; 8 pages.
Office Action issued in U.S. Appl. No. 11/967,489 on Feb. 6, 2012; 9 pages.
Office Action issued in U.S. Appl. No. 11/967,387 on Apr. 12, 2012; 13 pages.
Office Action issued in U.S. Appl. No. 12/327,737 on Mar. 26, 2012; 14 pages.
Notice of Allowance issued in U.S. Appl. No. 12/233,075 on Mar. 22, 2012; 25 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218. Published in 2004.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,398 on Apr. 2, 2010; 39 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.

* cited by examiner

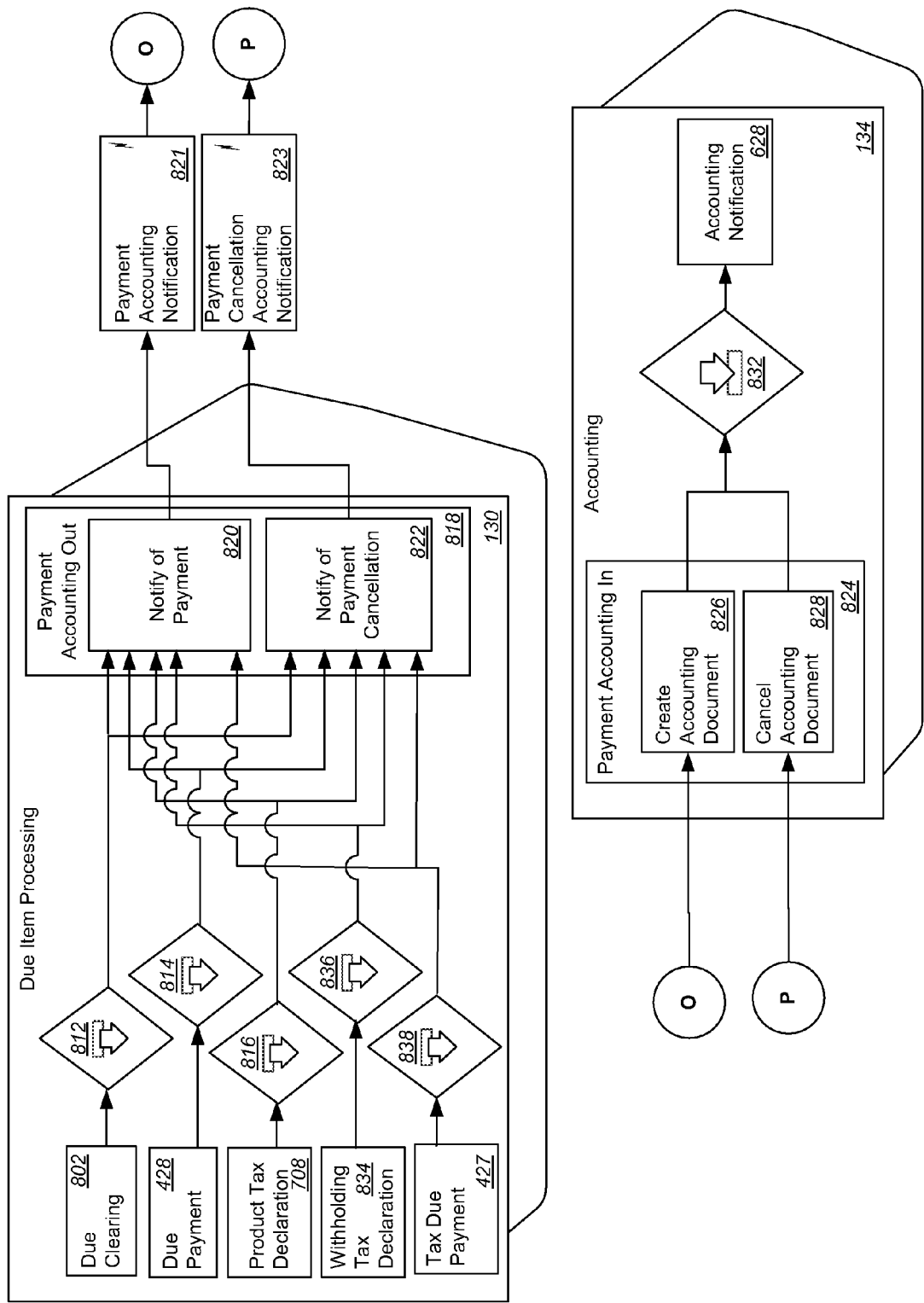

ARCHITECTURAL DESIGN FOR CUSTOMER RETURNS HANDLING APPLICATION SOFTWARE

BACKGROUND

The subject matter of this patent application relates to computer software architecture, and, more particularly, to the architecture of application software for customer returns handling.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing customer returns handling.

In its various aspects, the invention can be implemented as methods, systems, and apparatus, including computer program products, for implementing a software architecture design for a software application implementing customer returns handling. The software application is structured as multiple process components interacting with each other through service operations, each implemented for a respective process component. The process components include an Accounting process component, a Customer Return Processing process component, a Sales Order Processing process component, a Customer Invoice Processing process component, a Due Item Processing process component, a Balance of Foreign Payment Management process component, a Payment Processing process component, a Site Logistics Processing process component, an Inbound Delivery Processing process component, an Inventory Processing process component, and a Supply and Demand Matching process component.

In its various aspects, the invention can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

FIG. 8 is a block diagram showing interactions between the Due Item Processing process component and the Accounting process component.

DETAILED DESCRIPTION

Figure 1:
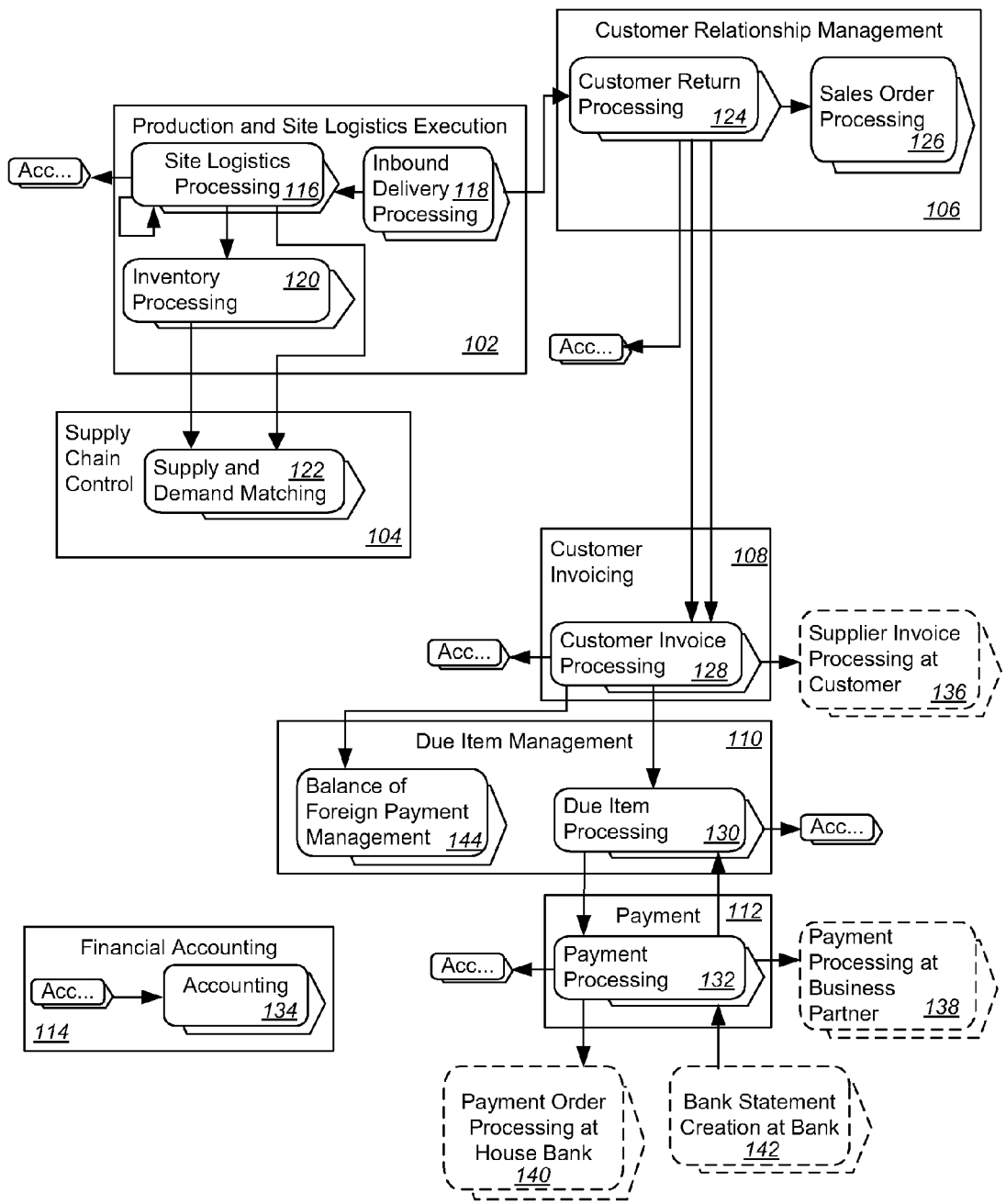
FIG. 1 is a block diagram showing a software architectural design for a customer returns handling software application.

FIG. 1 shows the software architectural design for a customer returns handling software application. The customer returns handling application is software that implements an end-to-end process used to manage goods that are returned by customers.

As shown in FIG. 1, the customer returns handling design includes seven deployment units: a Production and Site Logistic Execution deployment unit 102, a Supply Chain Control deployment unit 104, a Customer Relationship Management deployment unit 106, a Customer Invoicing deployment unit 108, a Due Item Management deployment unit 110, a Payment deployment unit 112, and a Financial Accounting deployment unit 114.

The Production and Site Logistics Execution deployment unit 102 includes a Site Logistics Processing process component 116, an Inbound Delivery Processing process component 118, and an Inventory Processing process component 120. The Site Logistics Processing process component 116 handles the preparation, physical execution, and confirmation of logistics processes within a site. Logistics processes, which are based on site logistics process models, can include picking, packing, shipping, receiving as well as value added services. The Inbound Delivery Processing process component 118 handles the management and processing of the inbound delivery requirements for received goods from a vendor. It combines all document-based tasks for the inbound delivery process, and enables communication with the originating document, the vendor and invoicing. The Inventory Processing process component 120 handles the management of inventory and recording of inventory changes. It provides services to maintain current stock, content and structure of logistic units and allocations.

The Supply Chain Control deployment unit 104 includes a Supply and Demand Matching process component 122. The Supply and Demand Matching process component 122 handles the management of all the tasks necessary to ensure that sufficient material receipt elements exist to cover material demand while taking available capacity into account.

The Customer Relationship Management deployment unit 106 includes a Customer Return Processing process component 124 and a Sales Order Processing process component 126. The Customer Return Processing process component 124 handles the processing of requests made by customers to a seller to take back goods that were delivered, and to reverse a sale. The Sales Order Processing process component 126 handles the processing of customers' requests to seller for the delivery of goods, on a specific date, for a specific quantity, and for a specific price.

The Customer Invoicing deployment unit 108 includes a Customer Invoice Processing process component 128. The Customer Invoice Processing process component 128 handles the invoicing of customers for the delivery of goods or the provision of services.

The Due Item Management deployment unit 110 includes a Due Item Processing process component 130 and a Balance of Foreign Payment Management process component 144. The Due Item Processing process component 130 handles the collection, management, and monitoring of trade receivables or payables and corresponding sales tax or withholding tax. The Balance of Foreign Payment Management process component 144 handles the collection, processing and reporting of receivables and payables according to foreign trade regulations that are required by the central banks to create the balance of payments of a country.

The Payment deployment unit 112 includes a Payment Processing process component 128. The Payment Processing process component 132 handles the processing and management of all payments. In addition, the Payment Processing process component 132 is responsible for associated communications with financial institutions such as banks, and provides primary input for liquidity management.

The Financial Accounting deployment unit 114 includes an Accounting process component 134. The Accounting process component 134 represents relevant business transactions for valuation and profitability analysis.

A number of external process components, described below, will be used to describe the architectural design. These include: a Supplier Invoice Processing at Customer process component 136, a Payment Processing at Business Partner process component 138, a Payment Order Processing at House Bank process component 140, and a Bank Statement Creation at Bank process component 142. The Supplier Invoice Processing at Customer process component 136 can be informed about a creation or cancellation of a customer invoice from the Customer Invoice Processing process component 128. The Payment Processing at Business Partner process component 138 can notify the Payment Processing process component 132 about payments in transfer. The Payment Order Processing at House Bank process component 140 can confirm a performed action, such as a bank transfer, debit, or printing action, to a requester. The Bank Statement Creation at Bank process component 142 can notify the Payment Processing process component 132 about transactions on a bank account.

The Payment Processing at Business Partner process component 138, the Payment Order Processing at House Bank process component 140, and the Bank Statement Creation at Bank process component 142 can interact with the Payment Processing process component 132.

The Supplier Invoice Processing at Customer process component 136 can receive messages from the Customer Invoice Processing process component 128.

Figure 2:
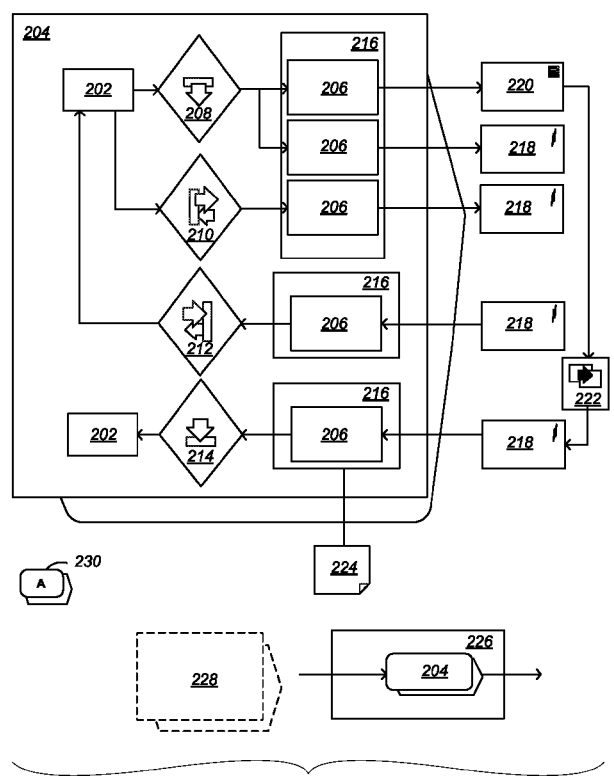
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions Between Process Components "Payment Processing" and "Payment Processing at Business Partner"

Figure 3:
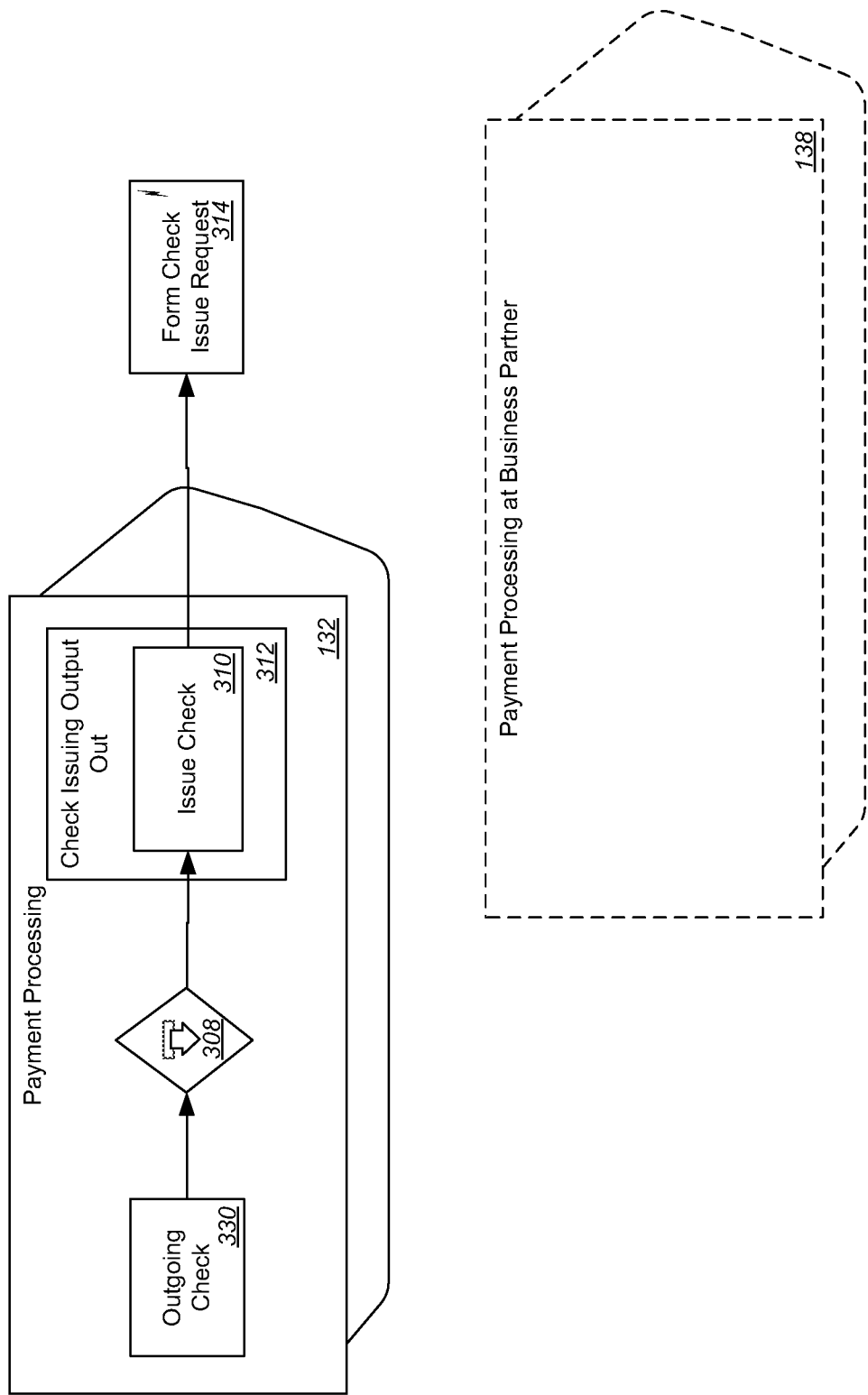
FIG. 3 is a block diagram showing interactions between a Payment Processing process component and a Payment Processing at Business Partner process component.

FIG. 3 is a block diagram showing interactions between the Payment Processing process component 132 and the Payment Processing at Business Partner process component 138 in the architectural design of FIG. 1. The interaction starts with the creation of an outgoing check from a payment order within the Payment Processing process component 132. For example, the Payment Processing process component 132 can print an outgoing check that will be sent to the business partner.

As shown in FIG. 3, the Payment Processing process component 132 includes an Outgoing Check business object 330. The Outgoing Check business object 330 represents a check issued by a company payable to a business partner to fulfill a payment order. The Outgoing Check business object 330 uses an Issue Check From Outgoing Check to Business Partner outbound process agent 308 to invoke an Issue Check operation 310. The operation 310 is included in a Check Issuing Output Out interface 312. The operation 310 requests the issuing of a check and sends a Form Check Issue Request message 314 to the Payment Processing at Business Partner process component 138.

Interactions Between Process Components "Payment Processing" and "Due Item Processing"

Figure 4:
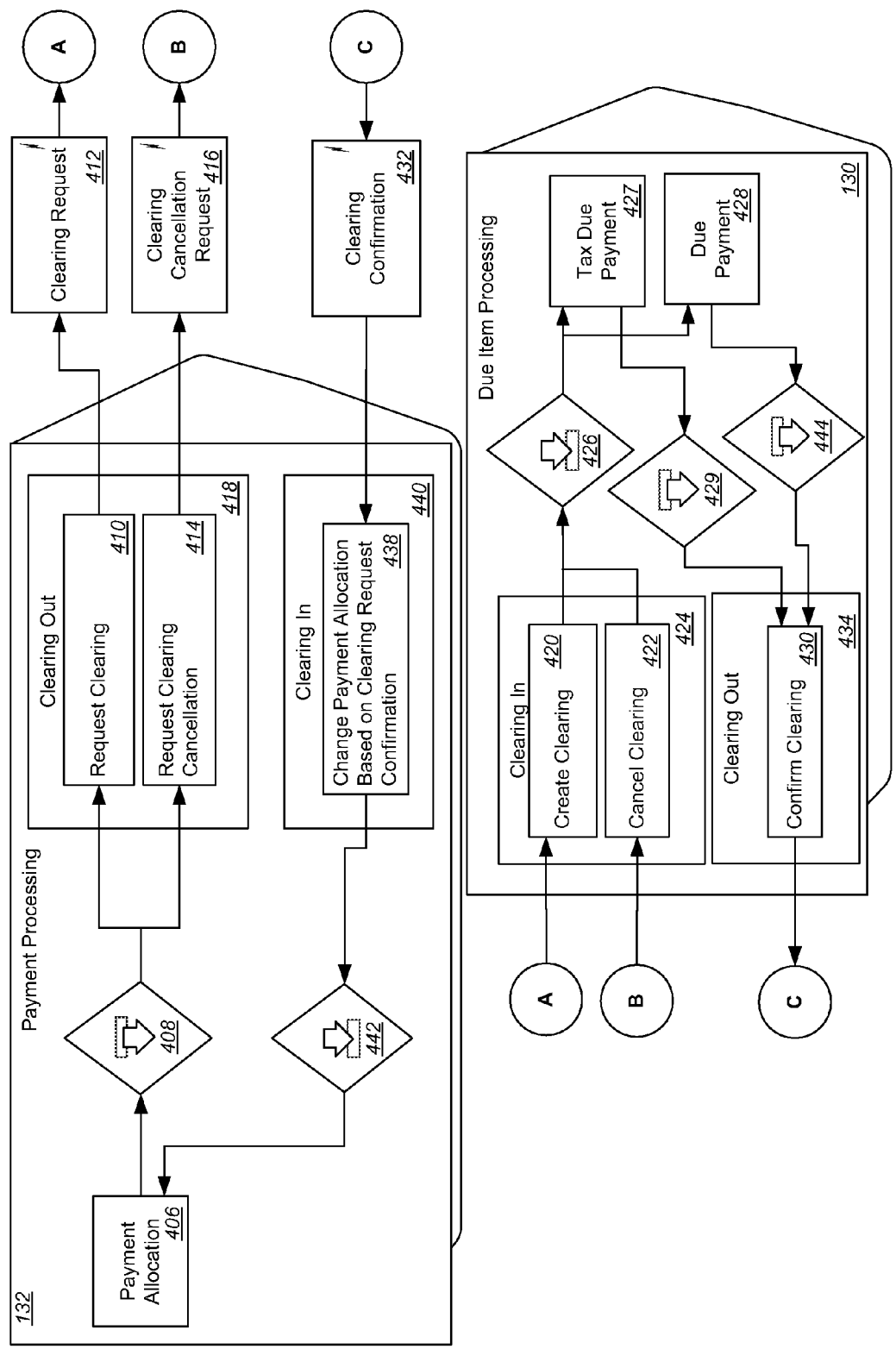
FIG. 4 is a block diagram showing interactions between the Payment Processing process component and a Due Item Processing process component.

FIG. 4 is a block diagram showing interactions between the Payment Processing process component 132 and the Due Item Processing process component 130 in the architectural design of FIG. 1. The interaction starts when a payment allocation is created or cancelled with the Due Item Processing process component 130 responsible for the clearing of a payment. The Payment Processing process component 132 requests the clearing or the cancellation of a clearing from the Due Item Processing process component 130. The Due Item Processing process component 130 informs the requester about the clearing result.

As shown in FIG. 4, the Payment Processing process component 132 includes a Payment Allocation business object 406. The Payment Allocation business object 406 represents the assignment of a payment item to the payment reasons from which the payment item originated.

The Payment Allocation business object 406 uses a Request Clearing Maintenance from Payment Allocation to Due Item Processing outbound process agent 408 to invoke a Request Clearing operation 410. The operation 410 generates a Clearing Request message 412. The message 412 requests the clearing of payments within the Due Item Processing process component 130. The Request Clearing Maintenance from Payment Allocation to Due Item Processing outbound process agent 408 can also use a Request Clearing Cancellation operation 414 to cancel a payment clearing using a Clearing Cancellation Request message 416. Both operations 410 and 414 are included in a Clearing Out interface 418.

The message 412 is received by a Create Clearing operation 420. The operation 420 creates a clearing for business partner-initiated payments. Similarly, the Clearing Cancellation Request message 416 is received by a Cancel Clearing operation 422. The operation 416 cancels a previously sent clearing request by reference. The Create Clearing operation 420 and the Cancel Clearing operation 422 are both included in a Clearing In interface 424. Upon creating or canceling a clearing, a Maintain Clearing inbound process agent 426 updates a Tax Due Payment business object 427 or a Due Payment business object 428, or both.

The Tax Due Payment business object 427 represents a payment request or payment confirmation with regard to trade receivables and payables (e.g., from goods and/or services, etc.). The Due Payment business object 428 represents a payment request or payment confirmation with regard to trade receivables and payables.

The Tax Due Payment business object 427 uses a Confirm Clearing from Due Payment to Payment Processing outbound process agent 429 to invoke a Confirm Clearing operation 430. The operation 430 is included in a Clearing Out interface 434. The operation 430 can initiate a Clearing Confirmation message 432 to the Payment Processing process component 132. The message 432 is received by the Payment Processing process component 132 and handled by a Change Payment Allocation Based on Clearing Request Confirmation operation 438. The operation 438 confirms the execution or rejection of a sent clearing request. The operation 438 is included in a Clearing In interface 440. An update can be made to the Payment Allocation business object 406 using a Change Payment Allocation Based on Clearing Request Confirmation inbound process agent 442.

The Due Payment business object 428 uses a Confirm Clearing from Product Tax Declaration to Payment Processing outbound process agent 444 to invoke the Confirm Clearing operation 430. The agent 444 can confirm or reject clearing of a foreign-initiated payment for tax receivables payables from product tax. The operation 430 can initiate the Clearing Confirmation message 432 to the Payment Processing process component 132. The message 432 is received by the Payment Processing process component 132 and handled by the Change Payment Allocation Based on Clearing Request Confirmation operation 438. The operation 438 confirms the execution or rejection of a sent clearing request. An update can be made to the Payment Allocation business object 406 using the Change Payment Allocation Based on Clearing Request Confirmation inbound process agent 442.

Interactions Between Process Components "Site Logistics Processing" and "Supply and Demand Matching"

Figure 5:
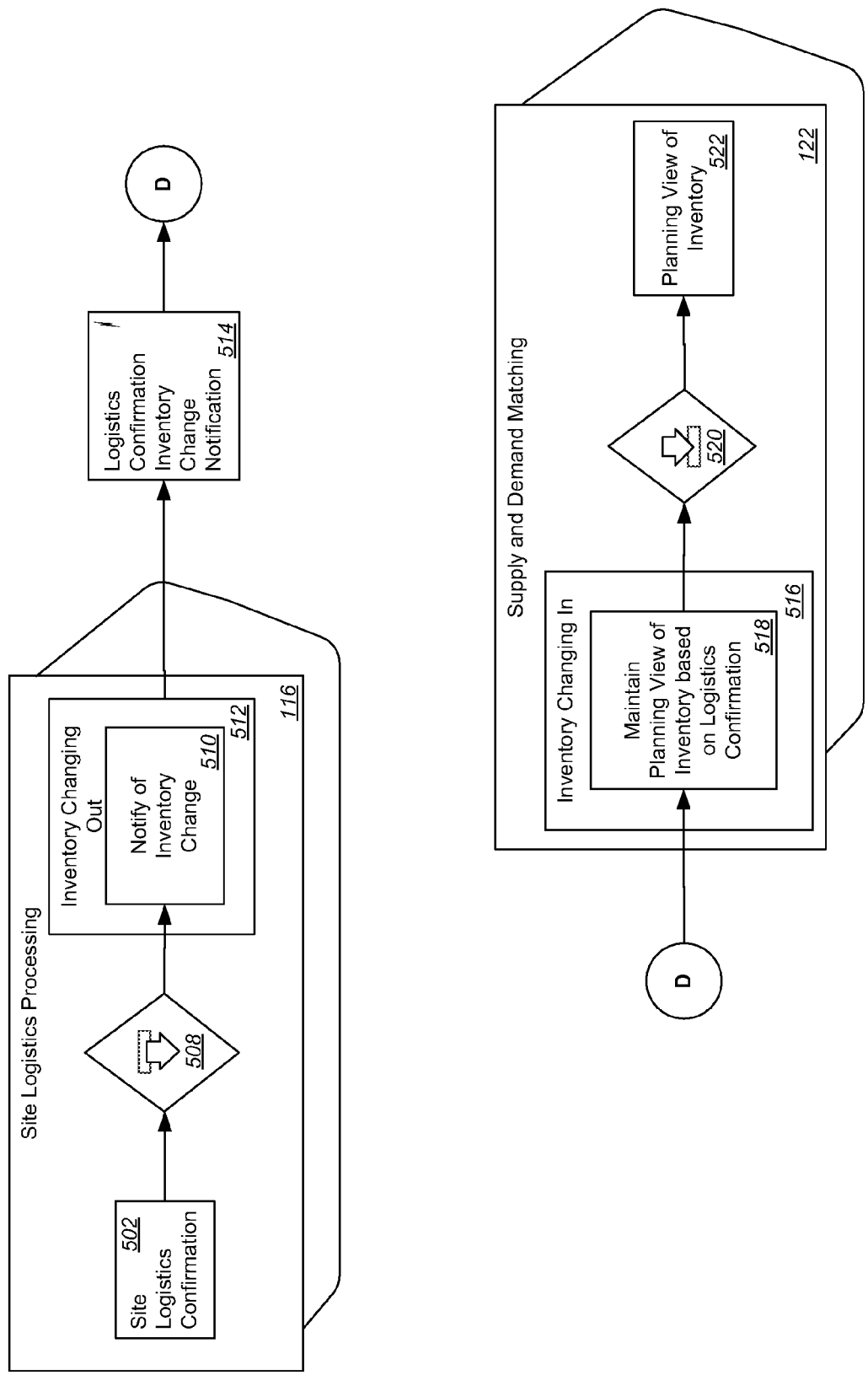
FIG. 5 is a block diagram showing interactions between a Site Logistics Processing process component and a Supply and Demand Matching process component.

FIG. 5 is a block diagram showing interactions between the Site Logistics Processing process component 116 and the Supply and Demand Matching process component 122 in the architectural design of FIG. 1. The interaction starts when an ad-hoc goods movement is posted. The Site Logistics Processing process component 116 updates the planning view on inventory to allow accurate material planning in the Supply and Demand Matching process component 122.

As shown in FIG. 5, the Site Logistics Processing process component 116 includes a Site Logistics Confirmation business object 502. The Site Logistics Confirmation business object 502 represents a record of confirmed logistic process changes, which result from the execution of a site logistics process at a specific time. For example, logistic process changes can include inventory changes, plan adjustments, resource utilizations, and progress status changes.

The Site Logistics Confirmation business object 502 uses a Notify of Inventory Change from Site Logistics Confirmation to Supply and Demand Matching outbound process agent 508. The Notify of Inventory Change form Site Logistics Confirmation to Supply and Demand Matching outbound process agent 508 invokes a Notify of Inventory Change operation 510. The operation 510 is included in an Inventory Changing Out interface 512. The operation 510 sends a Logistics Confirmation Inventory Change Notification message 514 to the Supply and Demand Matching process component 122.

A Maintain Planning View of Inventory based on Logistics Confirmation operation 518 handles the Logistics Confirmation Inventory Change Notification message 514. The operation 518 is included in an Inventory Changing In interface 516. The operation 518 uses a Maintain Planning View of Inventory based on Logistics Confirmation inbound process agent 520 to update a Planning View of Inventory business object 522. The Planning View of Inventory business object 522 represents a view of material stock, aggregated at the level of the supply planning area.

Interactions Between Process Components "Customer Invoice Processing" and "Accounting"

Figure 6:
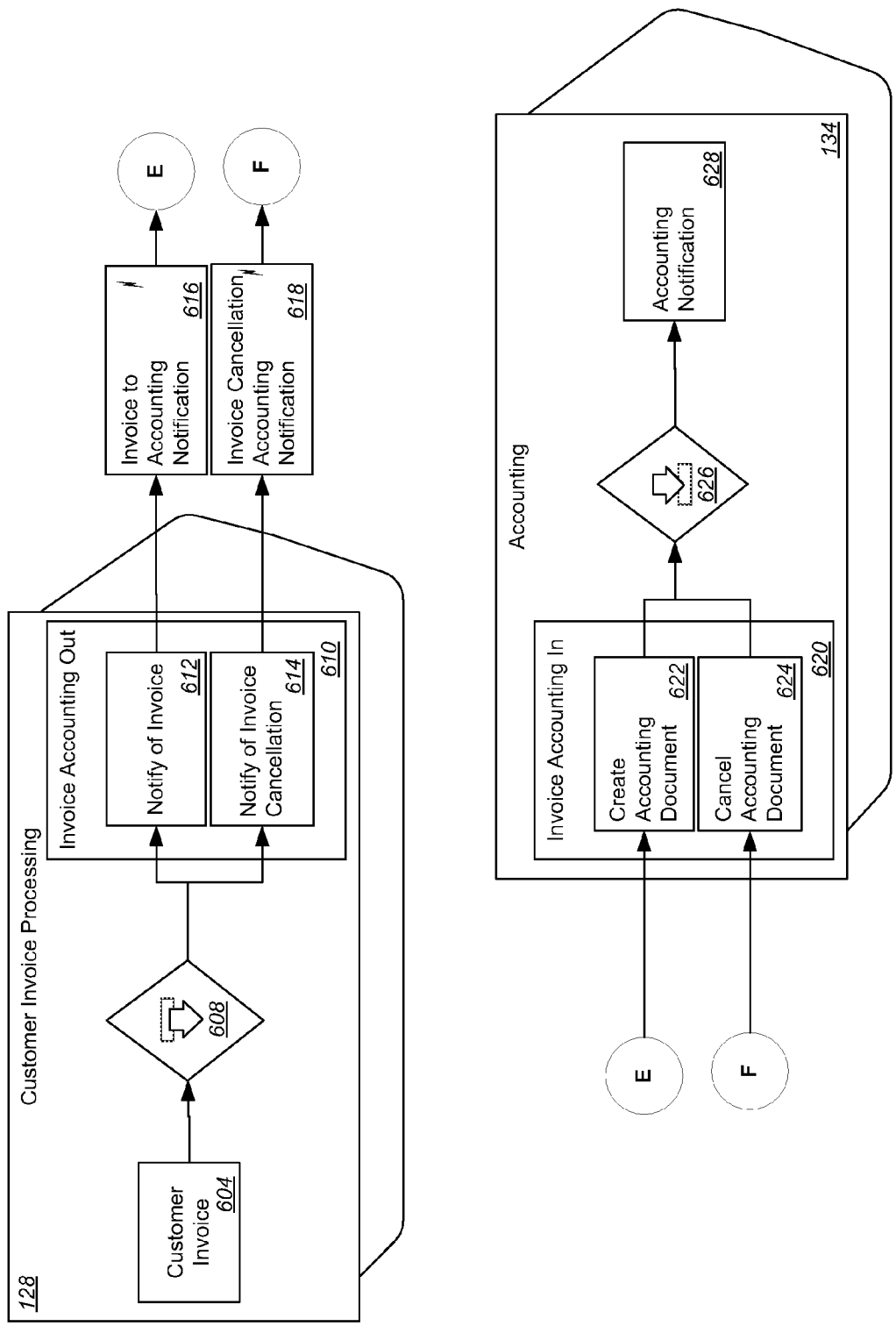
FIG. 6 is a block diagram showing interactions between a Customer Invoice Processing process component and an Accounting process component.

FIG. 6 is a block diagram showing interactions between the Customer Invoice Processing process component 128 and the Accounting process component 134 in the architectural design of FIG. 1. The Customer Invoice Processing process component 128 can request a creation or cancellation of accounting documents from the Accounting process component 134 based on a creation or cancellation of a customer invoice.

As shown in FIG. 6, the Customer Invoice Processing process component 128 includes a Customer Invoice business object 604. The Customer Invoice business object 604 represents a binding statement of amounts receivable resulting, for example, from deliveries to a customer, services performed for a customer, adjustments to these receivables, or credit memos to a customer.

The Customer Invoice Processing process component 128 uses a Notify of Customer Invoice to Accounting outbound process agent 608 to invoke a Notify of Invoice operation 612 or a Notify of Invoice Cancellation operation 614. The Notify of Invoice operation 612 informs the Accounting process component 134 about outgoing invoices or credit memos. The Notify of Invoice Cancellation operation 614 informs the Accounting process component 134 about cancellation of outgoing invoices or credit memos. The operations 612, 614 are included in an Invoice Accounting Out interface 610. The operation 612 generates an Invoice Accounting Notification message 616. The operation 614 generates an Invoice Cancellation Accounting Notification message 618.

A Create Accounting Document operation 622 handles the Invoice to Accounting Notification message 616. A Cancel Accounting Document operation 624 handles the Invoice Cancellation Accounting Notification message 618. The operations 622, 624 are included in an Invoice Accounting In interface 620. The Create Accounting Document operation 622 creates an accounting document for the Customer Invoice business object 604. For example, the accounting document records payables, receivables, expenses and revenues for an invoice Accounting process component 134. The Cancel Accounting Document operation 624 cancels an accounting document for the Customer Invoice business object 604.

The operations 622, 624 can use a Maintain Accounting Document based on Invoice inbound process agent 626 to update an Accounting Notification business object 628 concerning the created invoice. The Accounting Notification business object 628 represents a notification sent by an operational component regarding a business transaction. It represents an operational business transaction in a standardized form for all business transaction documents, and contains the data needed to valuate the business transaction.

Interactions Between Process Components "Due Item Processing" and "Payment Processing"

Figure 7A:
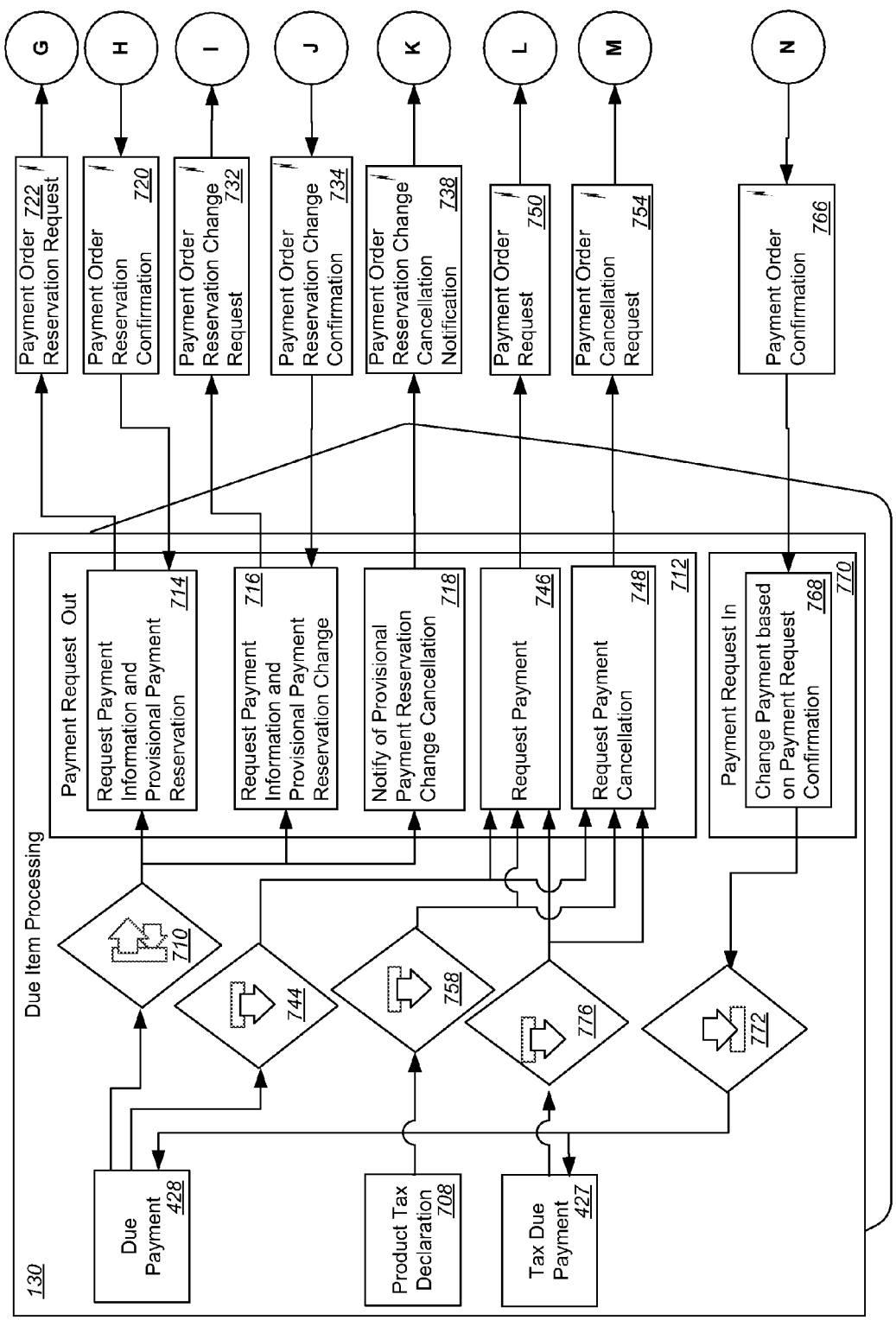
FIGS. 7A and 7B are block diagrams collectively showing interactions between the Due Item Processing process component and the Payment Processing process component.
Figure 7B:
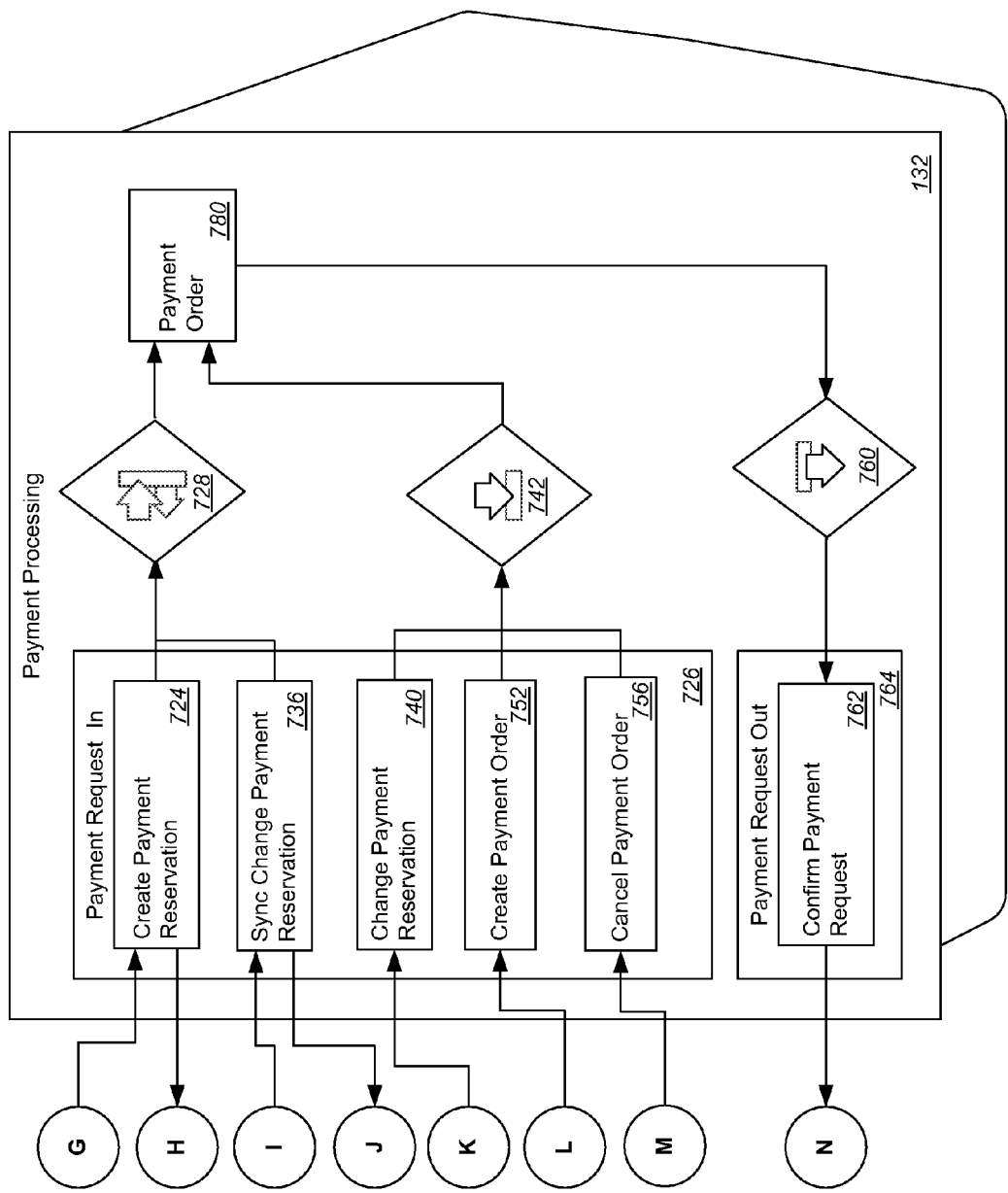

FIGS. 7A and 7B are block diagrams collectively showing interactions between the Due Item Processing process component 130 and the Payment Processing process component 132 in the architectural design of FIG. 1. The interaction starts when a payment for trade or tax receivables or payables is initiated or cancelled. The interaction allows the Due Item Processing process component 130 to request a reservation or change a previously made reservation of cash from the Payment Processing process component 132 within the creation process. The Payment Processing process component 132 confirms the creation or the change of a reservation immediately.

As shown in FIG. 7A, the Due Item Processing process component 130 includes the Due Payment business object 428, a Product Tax Declaration business object 708, and the Tax Due Payment business object 427. The Due Payment business object 428 represents a payment request or payment confirmation with regard to trade receivables and payables. The Product Tax Declaration business object 708 represents a declaration of the product tax payables and receivables of a company to the responsible tax authority according to the tax declaration arrangement, and country specific legal requirements that triggers the payment to the tax authority. The Tax Due Payment business object 427 represents a payment request or payment confirmation with regard to tax payables and receivables.

The Due Payment business object 428 uses a Synchronous Request Payment Reservation from Due Payment to Payment Processing synchronous outbound process agent 710 to invoke one or more operations including a Request Payment Information and Provisional Payment Reservation operation 714, a Request Payment Information and Provisional Payment Reservation Change operation 716, and a Notify of Provisional Payment Reservation Change Cancellation operation 718. The operations 714, 716, and 718 are included in a Payment Request Out interface 712. The Request Payment Information and Provisional Payment Reservation operation 714 can request payment information with a provisional reservation of money in payment processing. The Request Payment Information and Provisional Payment Reservation Change operation 716 can request payment information with a change of provisional reservation of money in payment processing. The Notify of Provisional Payment Reservation Cancellation operation 718 can register a change of a provisional payment to the last transactional or saved state.

If the Request Payment Information and Provisional Payment Reservation operation 714 is invoked, the operation 714 generates a Payment Order Reservation Request message 722. If the Request Payment Information and Provisional Payment Reservation Change operation 716 is invoked, the operation 716 generates a Payment Order Reservation Change Request message 732. If the Notify of Provisional Payment Reservation Change Cancellation operation 718 is invoked, the operation 718 generates a Payment Order Reservation Change Cancellation Notification message 738.

The Due Payment business object 428 also uses a Request Payment from Due Payment to Payment Processing outbound process agent 744 to invoke a Request Payment operation 746 or a Request Payment Cancellation operation 748. The operations 744 and 746 are included in the Payment Request Out interface 712. The Request Payment operation 746 sends a request for payment to the Payment Processing process component 130. This confirms a previously made provisional payment. The Request Payment Cancellation operation 748 cancels at least one provisional, requested, or ordered payment. If the Request Payment operation 746 is invoked, a Payment Order Request message 750 is generated. If the Request Payment Cancellation operation 748 is invoked, the operation 748 generates a Payment Order Cancellation Request message 754.

The Product Tax Declaration business object 708 uses a Request Payment from Product Tax Declaration to Payment Processing outbound process agent 758 to invoke the Request Payment operation 746 or the Request Payment Cancellation operation 748. If the Request Payment operation 746 is invoked, a Payment Order Request message 750 is generated. If the Request Payment Cancellation operation 748 is invoked, the operation 748 generates a Payment Order Cancellation Request message 754.

The Tax Due Payment business object 427 uses a Request Payment from Tax Due Payment to Payment Processing outbound process agent 776 to invoke the Request Payment operation 746 or the Request Payment Cancellation operation 748. If the Request Payment operation 746 is invoked, a Payment Order Request message 750 is generated. If the Request Payment Cancellation operation 748 is invoked, the operation 748 generates a Payment Order Cancellation Request message 754.

As shown in FIG. 7B, a Create Payment Reservation operation 724 receives the Payment Order Reservation Request message 722. The operation 724 uses a Synchronous Request Payment Reservation from Due Payment to Payment Processing synchronous inbound process agent 728 to create, change, or cancel a payment order for a reservation request. The synchronous inbound process agent 728 updates a Payment Order business object 780. The Payment Order business object 780 represents an order within a company to make a payment to a business partner at a specified time. A payment order can be a collective order that includes several individual orders.

A synchronous Change Payment Reservation operation 736 receives a Payment Order Reservation Change Request message 732. The operation 736 uses the synchronous Request Payment Reservation from Due Payment to Payment Processing inbound process agent 728 to update the Payment Order business object 780.

A Change Payment Reservation operation 740 receives the Payment Order Reservation Change Cancellation Notification message 738. A Create Payment Order operation 752 receives the Payment Order Request message 750. A Cancel Payment Order operation 756 receives the Payment Order Cancellation Request message 754. The operations 740, 752, and 756 use a Maintain Payment Order inbound process agent 742 to update the Payment Order business object 780. The Cancel Payment Order operation 756 cancels a previously sent payment request by reference. The Create Payment Order operation 752 cancels a request for payment. The operations 724, 736, 740, 752, and 756 are included in a Payment Request In interface 726.

The Payment Order business object 780 uses a Confirm Payment Request from Payment Order to Due Item Processing outbound process agent 760 to invoke a Confirm Payment Request operation 762. The operation 762 confirms a processing status of a payment to a sender. The operation 762 is included in a Payment Request Out interface 764. The Confirm Payment Request operation 762 generates a Payment Order Confirmation message 766.

As shown in FIG. 7A, the Payment Order Confirmation message 766 is received in a Change Payment based on Payment Request Confirmation operation 768. The operation 768 confirms the execution of a payment request or a payment request cancellation. The operation 768 is included in a Payment Request In interface 770. The Change Payment based on Payment Request Confirmation operation 768 uses a Change Payment based on Payment Request Confirmation inbound process agent 772 to update the Due Payment business object 428.

The Create Payment Reservation 724 operation (shown in FIG. 7B) sends a Payment Order Reservation Confirmation message 720 to the Due Item Processing process component 130 (shown in FIG. 7A). The message 720 is a confirmation response received in the Request Payment Information and Provisional Payment Reservation operation 714.

The Synchronous Change Payment Reservation operation 736 (shown in FIG. 7B) sends a Payment Order Reservation Change Confirmation message 734 to the Due Item Processing process component 130 (shown in FIG. 7A). The message 734 is a confirmation response received in the Request Payment Information and Provisional Payment Reservation Change operation 716.

Interactions Between Process Components "Due Item Processing" and "Accounting"

FIG. 8 is a block diagram showing interactions between the Due Item Processing process component 130 and the Accounting process component 134 in the architectural design of FIG. 1. The interaction starts when a payment or clearing for trade or tax receivables or payables is created or cancelled. The Due Item Processing process component 130 notifies the Accounting process component 134 about the creation or cancellation of the payment or clearing.

As shown in FIG. 8, the Due Item Processing process component 130 includes a Due Clearing business object 802, the Due Payment business object 428, the Product Tax Declaration business object 708, a Withholding Tax Declaration business object 834, and the Tax Due Payment business object 427. The Due Clearing business object 802 represents a group of receivables and payables for clearing. The Due Payment business object 428 represents a payment request or payment confirmation with regard to trade receivables and payables. The Product Tax Declaration business object 708 represents a declaration of the product tax payables or receivables of a company to the responsible tax authority according to the tax declaration arrangement and country specific legal requirements, that triggers the payment to the tax authority if required. The Withholding Tax Declaration business object 834 represents a declaration of withholding tax payables of a company to a tax authority according to the tax declaration arrangement and country specific legal requirements. The Tax Due Payment business object 427 represents a payment request or payment confirmation with regard to tax payables and receivables.

The Due Clearing business object 802 uses a Notify of Payment from Due Clearing to Accounting outbound process agent 812 to invoke a Notify of Payment operation 820 or a Notify of Payment Cancellation operation 822. The operations 820 and 822 are included in a Payment Accounting Out interface 818.

The Due Payment business object 428 uses a Notify of Payment from Due Payment to Accounting outbound process agent 814 to invoke the Notify of Payment operation 820 or the Notify of Payment Cancellation operation 822.

The Product Tax Declaration business object 708 uses a Notify of Payment from Product Tax Declaration to Accounting outbound process agent 816 to invoke the Notify of Payment operation 820 or the Notify of Payment Cancellation operation 822.

The Withholding Tax Declaration business object 834 uses a Notify of Payment from to Withholding Tax Declaration to Accounting outbound process agent 836 to invoke the Notify of Payment operation 820 or the Notify of Payment Cancellation operation 822.

The Tax Due Payment business object 427 uses a Notify of Payment from Tax Due Payment to Accounting outbound process agent 838 to invoke the Notify of Payment operation 820 or the Notify of Payment Cancellation operation 822.

The Notify of Payment operation 820 is invoked if a VAT (value added tax) declaration is released. The Notify of Payment Cancellation operation 822 is invoked if the VAT declaration is cancelled.

If the Notify of Payment operation 820 is invoked, the operation 820 generates a Payment Accounting Notification message 821. If the Notify of Payment Cancellation operation 823 is invoked, the operation 823 generates a Payment Cancellation Accounting Notification message 823.

The Payment Accounting Notification message 821 is received in a Create Accounting Document operation 826. The Create Accounting Document operation 826 handles the Payment Accounting Notification message 821. The Create Accounting Document operation 826 is included in a Payment Accounting In interface 824.

The Payment Cancellation Accounting Notification message 823 is received in a Cancel Accounting Document operation 828. The Cancel Accounting Document operation 828 handles the Payment Cancellation Accounting Notification message 823. The Cancel Accounting Document operation 828 is included in a Payment Accounting In interface 824.

The Create Accounting Document operation 826 and the Cancel Accounting Document operation 828 both use a Maintain Accounting Document based on Payment inbound process agent 832 to update the Accounting Notification business object 628. The Accounting Notification business object 628 represents a notification sent to the Accounting process component 134 by an operational component regarding a business transaction. For example, the Accounting Notification business object 628 represents this operational business transaction in a standardized form for all business transaction documents, and can include the data needed to valuate the business transaction.

Interactions Between Process Components "Customer Return Processing" and "Customer Invoice Processing"

Figure 9:
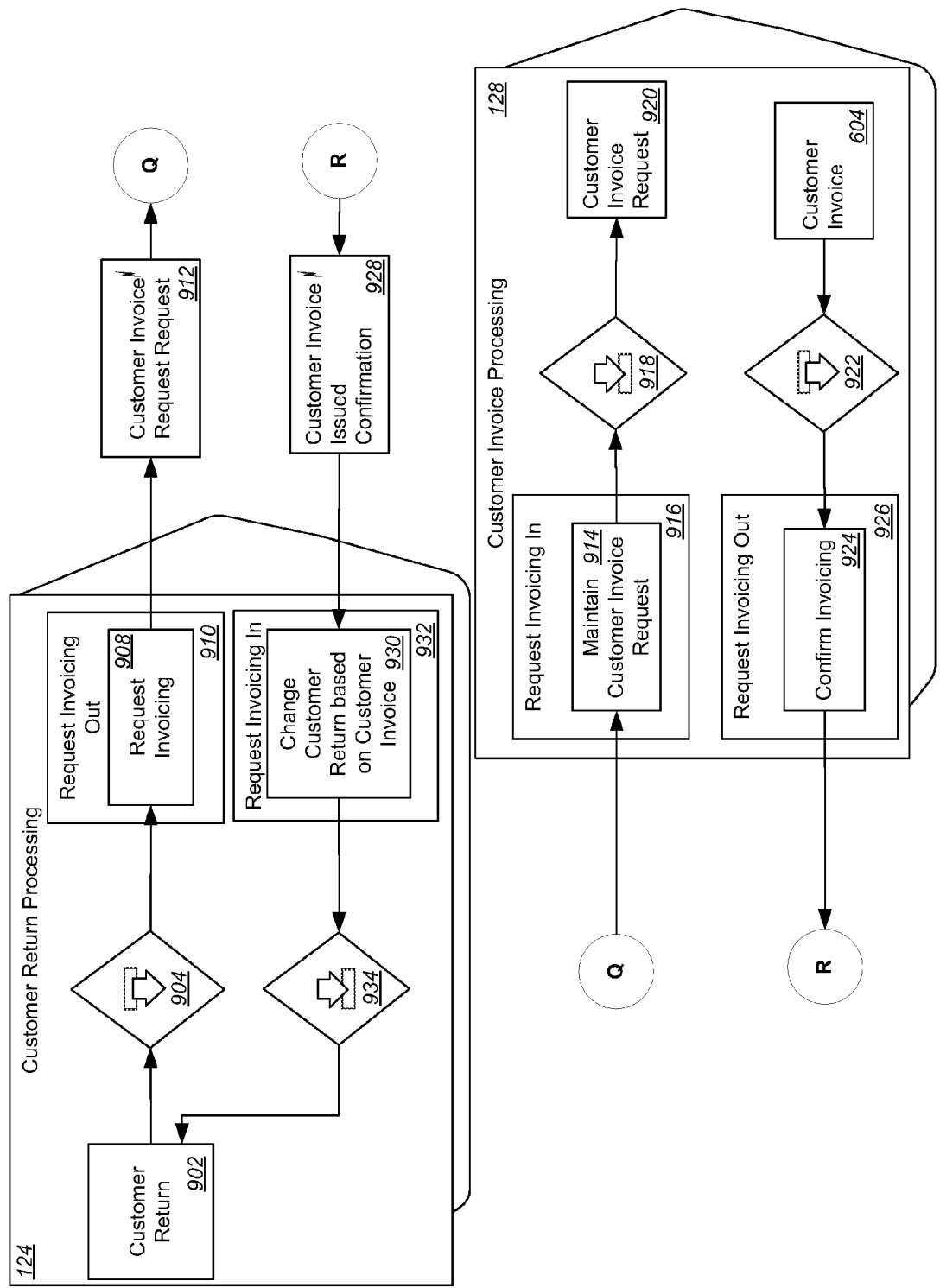
FIG. 9 is a block diagram showing an interaction between a Customer Return Processing process component and the Customer Invoice Processing process component related to requesting the creation, update or cancellation of invoices.

FIG. 9 is a block diagram showing interactions between the Customer Return Processing process component 124 and the Customer Invoice Processing process component 128, related to requesting the creation, update or cancellation of invoices, in the architectural design of FIG. 1. The interaction starts when a customer return is created or updated such as, for example, when the Customer Return Processing process component 124 requests the creation or update of a subledger account (based on sales) from accounting.

As shown in FIG. 9, the Customer Return Processing process component 124 includes a Customer Return business object 902. The Customer Return business object 902 represents a request made by a customer for a seller to take back goods that have been delivered, and to cancel a sale.

The Customer Return business object 902 uses a Request Invoicing from Customer Return to Customer Invoice Processing outbound process agent 904 to invoke a Request Invoicing operation 908. The Request Invoicing operation 908 requests invoicing of customer return; typically this causes the creation of a credit note in customer invoicing. The operation 908 is included in a Request Invoicing Out interface 910. The operation 908 generates a Customer Invoice Request Request message 912.

A Maintain Customer Invoice Request operation 914 handles the Customer Invoice Request Request message 912. The operation 914 is included in a Request Invoicing In interface 916. The operation 914 can use a Maintain Customer Invoice Request inbound process agent to update a Customer Invoice Request business object 920. The business object 920 represents a request to create one or several customer invoices, or to take account of the data for the underlying business document when creating a customer invoice.

The Customer Invoice Processing process component 128 can send a confirmation message back to the Customer Return Processing process component 124 using contents in the Customer Invoice business object 604. The business object 604 represents a binding statement of amounts receivable resulting, for example, from deliveries to a customer, services performed for a customer, adjustments to these receivables, or credit memos to a customer. The Customer Invoice business object 604 uses a Confirm Customer Invoice to Service Confirmation Processing outbound process agent 922 to invoke a Confirm Invoicing operation 924. The operation 924 is included in a Request Invoicing Out interface 926. The operation 924 generates a Customer Invoice Issued Confirmation message 928.

A Change Customer Return based on Customer Invoice operation 930 handles the Customer Invoice Issued Confirmation message 928. The operation 930 is included in a Request Invoicing In interface 932. The operation 930 uses a Change Customer Return based on Customer Invoice inbound process agent 934 to update the Customer Return business object 902.

Interactions Between Process Components "Payment Processing" and "Accounting"

Figure 10:
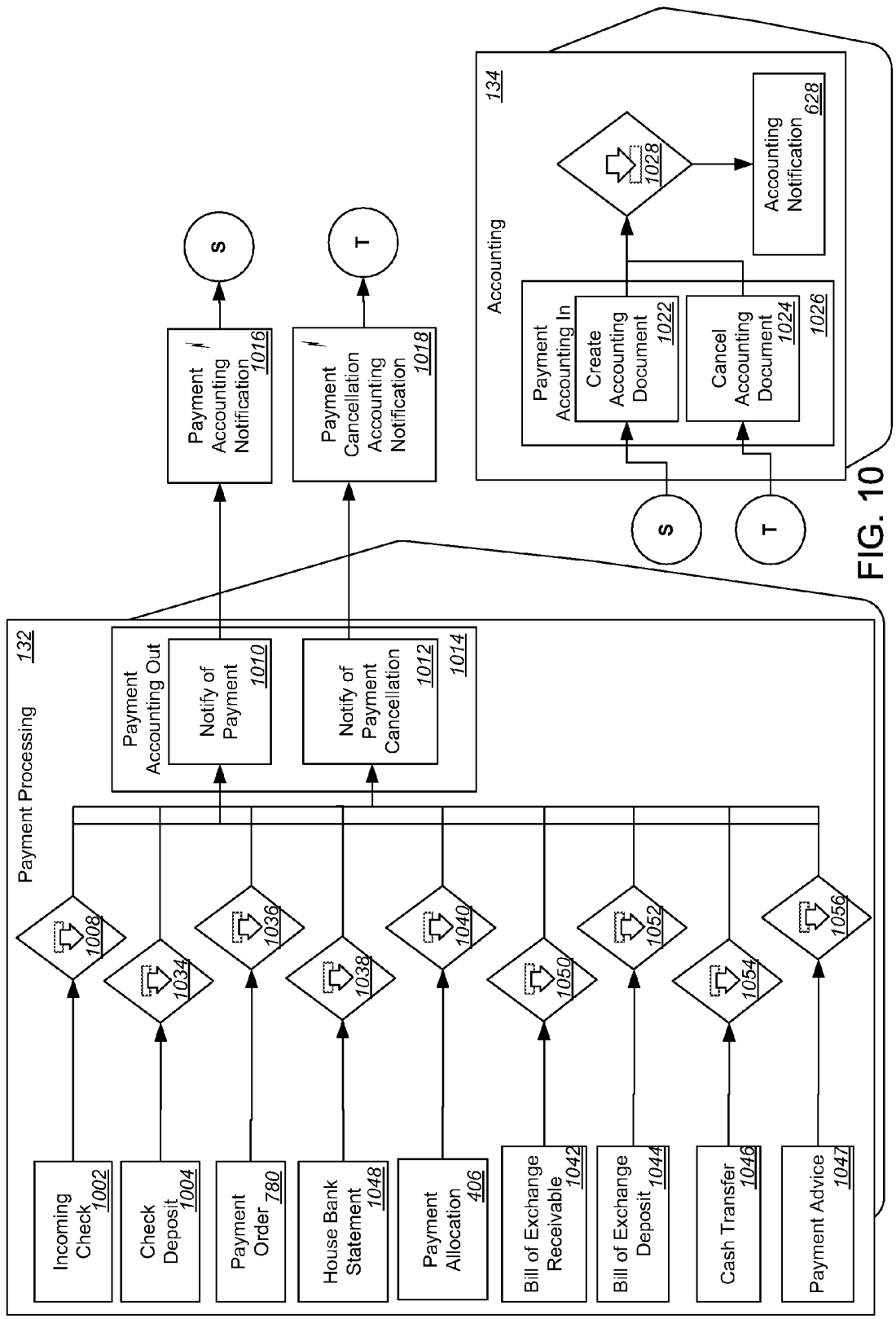
FIG. 10 is a block diagram showing interactions between the Payment Processing process component and the Accounting process component.

FIG. 10 is a block diagram showing interactions between the Payment Processing process component 132 and the Accounting process component 134 in the architectural design of FIG. 1. The interaction starts when a payment is ordered, received, allocated or cancelled. The Payment Processing process component 132 processes and manages payments received, as well as the associated communication with financial institutions such as banks. In addition, the Payment Processing process component provides input for liquidity management.

As shown in FIG. 10, the Payment Processing process component 132 includes an Incoming Check business object 1002, a Check Deposit business object 1004, the Payment Order business object 780, a House Bank Statement business object 1048, the Payment Allocation business object 406, a Bill of Exchange Receivable business object 1042, a Bill of Exchange Deposit business object 1044, a Cash Transfer business object 1046, and a Payment Advice business object 1047. The Incoming Check business object 1002 represents a check issued by a business partner payable to the company. The Check Deposit business object 1004 represents a deposit of checks at a house bank for credit to a house bank account. The Payment Order business object 780 represents an order within a company to make a payment to a business partner at a specified time. A payment order can be a collective order that contains several individual orders. The House Bank Statement business object 1048 represents a legally binding notification from the house bank about the revenues within a specific time period at a house bank account with a defined starting and closing balance. The Payment Allocation business object 406 represents an assignment of a payment item to the payment reasons from which the payment item originated. The Bill of Exchange Receivable business object 1042 represents a bill of exchange issued either by the company or by a business partner for the benefit of the company. The Bill of Exchange Deposit business object 1044 represents a deposit of bills of exchange receivable at a house bank for credit to a house bank account. The Cash Transfer business object 1046 represents a company—internal money transfer that includes: payments from one house bank account to another (house bank account transfer), payments from one cash storage to another (cash transfer), payments from a cash storage to a house bank account (cash deposit), and/or payments from a house bank account to a cash storage (cash withdrawal). The Payment Advice business object 1047 represents an announcement of a payment transaction by a business partner to the company, specifying payment reasons.

The Incoming check business object 1002 uses a Notify of Payment from Incoming Check to Accounting outbound process agent 1008 to invoke a Notify of Payment operation 1010 or a Notify of Payment Cancellation operation 1012. The operations 1010 and 1012 are included in a Payment Accounting Out interface 1014.

The Check Deposit business object 1004 uses a Notify of Payment from Check Deposit to Accounting outbound process agent 1034 to invoke the Notify of Payment operation 1010 or the Notify of Payment Cancellation operation 1012.

The Payment Order business object 780 uses a Notify of Payment from Payment Order to Accounting outbound process agent 1036 to invoke the Notify of Payment operation 1010 or the Notify of Payment Cancellation operation 1012.

The House Bank Statement business object 1048 uses a Notify of Payment from Bank Statement to Accounting outbound process agent 1038 to invoke the Notify of Payment operation 1010 or the Notify of Payment Cancellation operation 1012.

The Payment Allocation business object 406 uses a Notify of Payment from Payment Allocation to Accounting outbound process agent 1040 to invoke the Notify of Payment operation 1010 or the Notify of Payment Cancellation operation 1012.

The Bill of Exchange Receivable business object 1042 uses a Notify of Payment from Bill of Exchange Receivable to Accounting outbound process agent 1050 to invoke the Notify of Payment operation 1010 or the Notify of Payment Cancellation operation 1012.

The Bill of Exchange Deposit business object 1044 uses a Notify of Payment from Bill of Exchange Deposit to Accounting outbound process agent 1052 to invoke the Notify of Payment operation 1010 or the Notify of Payment Cancellation operation 1012.

The Cash Transfer business object 1046 uses a Notify of Payment Cash Transfer to Accounting outbound process agent 1054 to invoke the Notify of Payment operation 1010 or the Notify of Payment Cancellation operation 1012.

The Payment Advice business object 1047 uses a Notify of Payment from Payment Advice to Accounting outbound process agent 1056 to invoke the Notify of Payment operation 1010 or the Notify of Payment Cancellation operation 1012.

If the Notify of Payment operation 1010 is invoked, the operation 1010 generates a Payment Accounting Notification message 1016. If the Notify of Payment Cancellation operation 1012 is invoked, the operation 1012 generates a Payment Cancellation Accounting Notification message 1018.

A Create Accounting Document operation 1022 receives the Payment Accounting Notification message 1016. A Cancel Accounting Document operation 1024 receives the Payment Cancellation Accounting Notification message 1018. The operations 1022 and 1024 are included in a Payment Accounting Out interface 1026. The operations 1022 and 1024 use a Maintain Accounting Document based on Payment inbound process agent 1028 to update the Accounting Notification business object 628. The Accounting Notification business object 628 represents a notification sent to the Accounting process component 134 by an operational component regarding a business transaction. For example, the Accounting Notification business object 628 represents the operational business transaction in a standardized form for all business transaction documents, and can include the data needed to valuate the business transaction.

If the Notify of Payment operation 1010 is invoked, then the Payment Accounting Notification message 1016 is sent to the Accounting process component 134 to update the Accounting Notification business object 628. If the Notify of Payment Cancellation operation 1012 is invoked, then the Payment Cancellation Accounting Notification message 1018 is sent to the Accounting process component 134 to update the Accounting Notification business object 628.

Interactions Between Process Components "Inventory Processing" and "Supply and Demand Matching"

Figure 11:
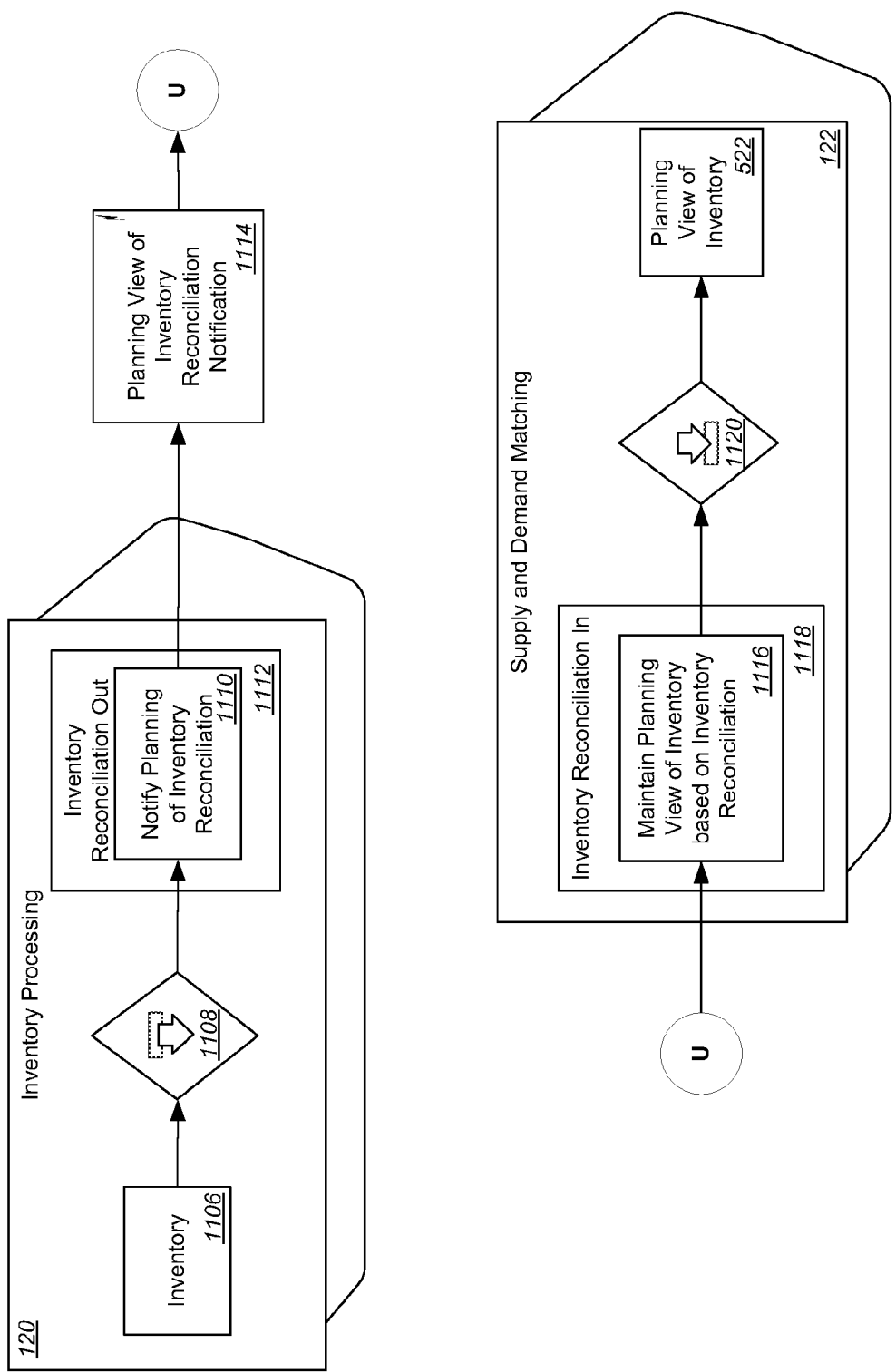
FIG. 11 is a block diagram showing interactions between an Inventory Processing process component and the Supply and Demand Matching process component.

FIG. 11 is a block diagram showing interactions between the Inventory Processing process component 120 and the Supply and Demand Matching process component 122 in the architectural design of FIG. 1. The interactions can be used to synchronize the available quantities of the planning view on inventory in the Supply and Demand Matching process component 122 with the available quantities of the original inventory in the Inventory Processing process component 120.

As shown in FIG. 11, the Inventory Processing process component 120 includes an Inventory business object 1106. The Inventory business object 1106 represents a quantity of all the materials in a location including the material reservations at this location.

The Inventory business object 1106 uses a Notify of Reconciliation from Inventory to Supply and Demand Matching outbound process agent 1108 to invoke a Notify Planning of Inventory Reconciliation operation 1110. The operation 1110 sends an inventory reconciliation to the Supply and Demand Planning process component 122. The operation 1110 is included in an Inventory Reconciliation Out interface 1112. The operation generates a Planning View of Inventory Reconciliation Notification message 1114 to send the inventory reconciliation update.

A Maintain Planning View of Inventory based on Inventory Reconciliation operation 1116 handles the Planning View of Inventory Reconciliation Notification message 1114. The operation 1116 is included in an Inventory Reconciliation In interface 1116. The operation 1118 uses a Maintain Planning View of Inventory Reconciliation inbound process agent 1120 to update the Planning View of Inventory business object 522. The business object 522 represents a view of a material stock, aggregated at the level of the Supply Planning Area.

Interactions Between Process Components "Payment Processing" and "Payment Order Processing at House Bank"

Figure 12:
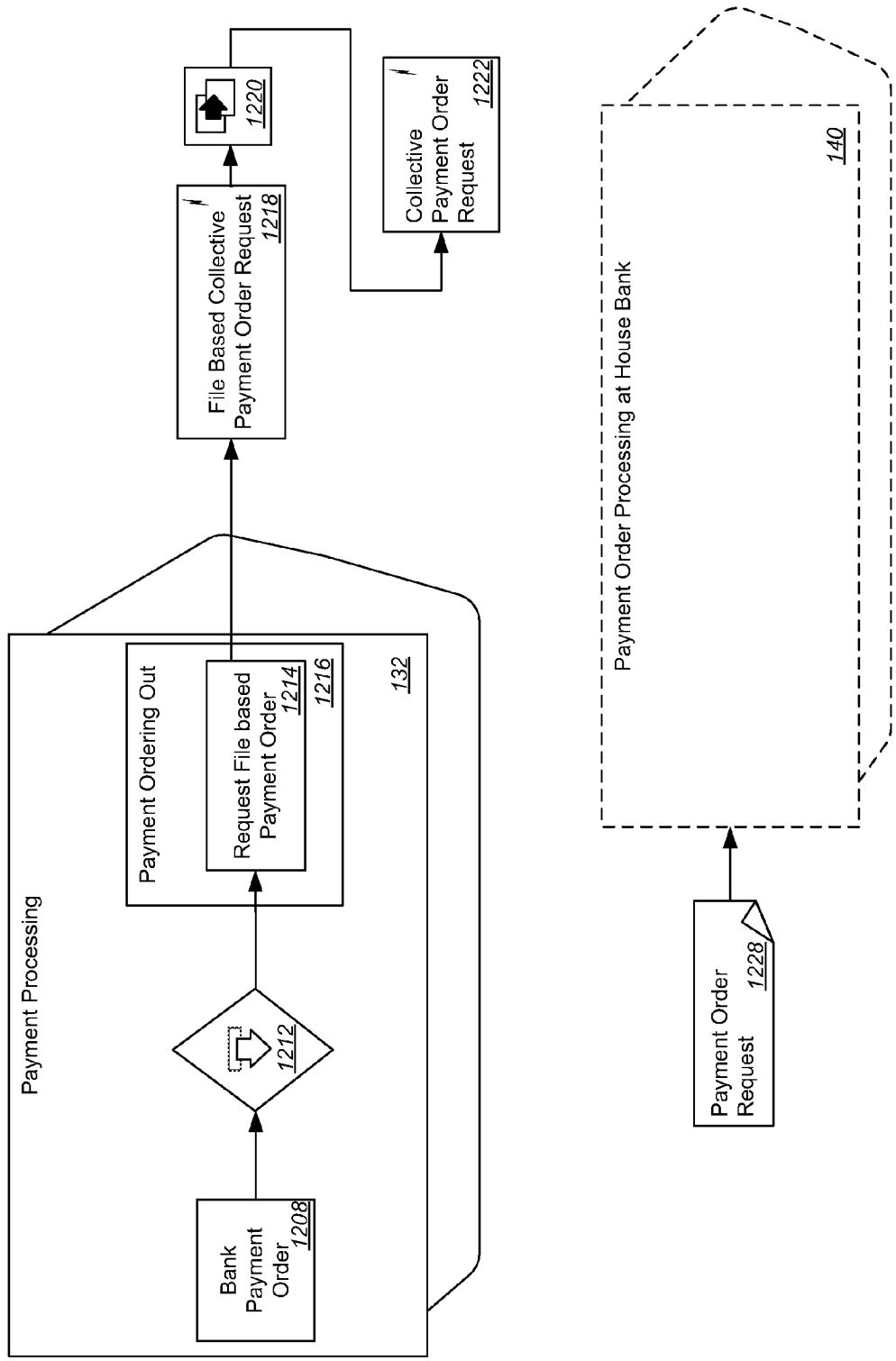
FIG. 12 is a block diagram showing interactions between the Payment Processing process component and a Payment Order Processing at House Bank process component.

FIG. 12 is a block diagram showing interactions between the Payment Processing process component 132 and the Payment Order Processing at House Bank process component 140 in the architectural design of FIG. 1.

As shown in FIG. 12, the Payment Processing process component 132 includes a Bank Payment Order business object 1210. The Bank Payment Order business object 1210 represents an order to a house bank to make a transfer or direct debit from a specified house bank account to fulfill a payment order. The house bank can be a bank located in France.

The Bank Payment Order business object 1210 uses a Request File Based Payment Order from Bank Payment Order to House Bank outbound process agent 1216 to invoke a Request File based Payment Order operation 1218. The Request File based Payment Order operation 1218 instructs a house bank, using a file, to make a bank transfer or a direct debit. The operation 1218 is included in a Payment Ordering Out interface 1220. The Request File based Payment Order operation 1218 generates a File based Collective Payment Order Request message 1222. The File based Collective Payment Order Request message 1222 uses Mapping Entity 1224 to transform the file-based message type to a Collective Payment Order Request message 1226 that can be received by the Payment Order Processing at House Bank process component 140. The Collective Payment Order Request message 1226 is in a format that the house bank (a bank located in France) can understand. A collective payment order can be an instruction based on a file transfer to a credit institution to carry out one or more payment transactions (e.g. bank transfers or direct debits). The Payment Order Processing at House Bank process component 140 receives information from the Payment Processing process component 132 using a Payment Order Request communication channel template 1228. The communication channel template 1228 can provide information from a third party about a payment order request.

Interactions Between Process Components "Bank Statement Creation at Bank" and "Payment Processing"

Figure 13:
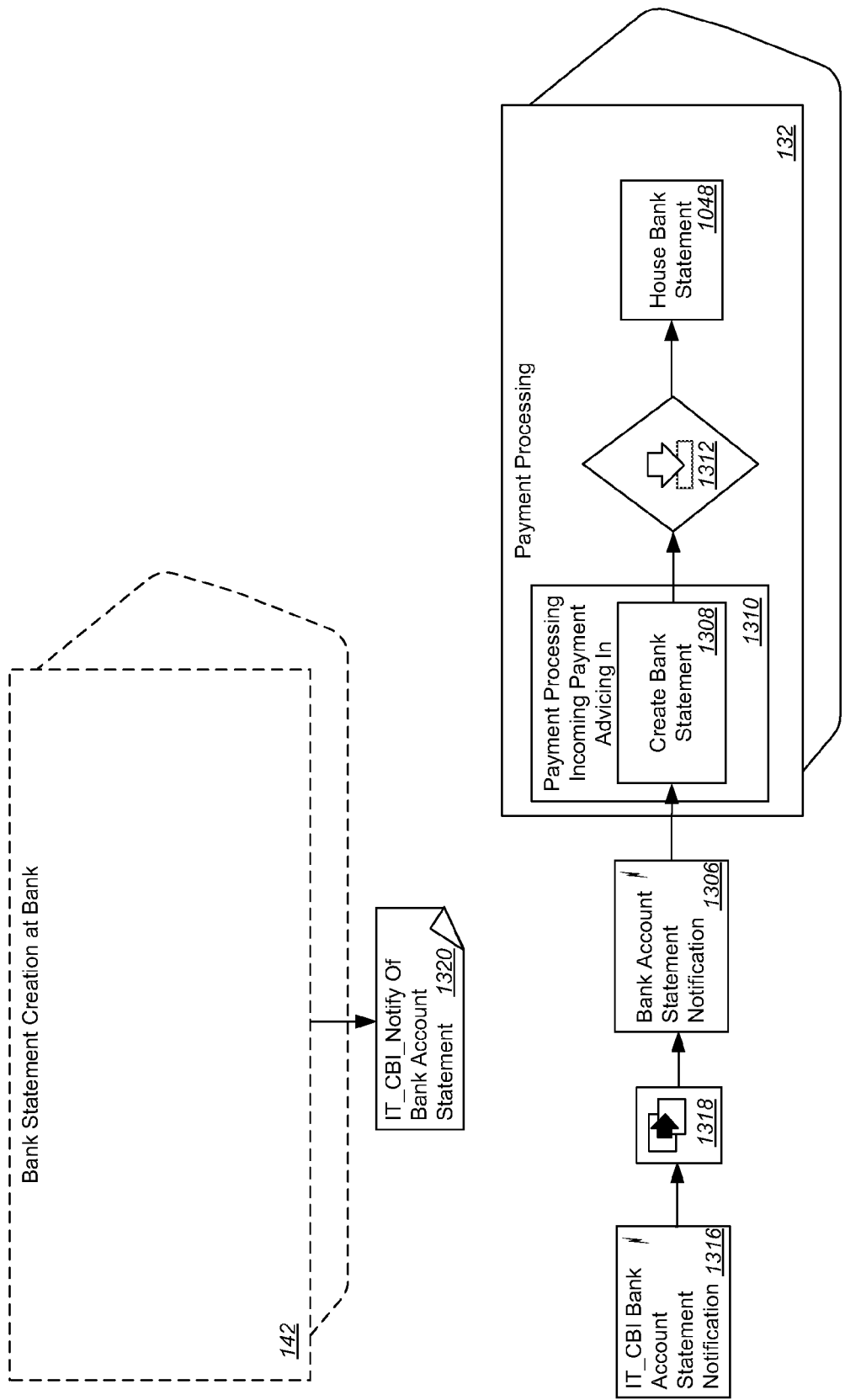
FIG. 13 is a block diagram showing interactions between a Bank Statement Creation at Bank process component and the Payment Processing process component.

FIG. 13 is a block diagram showing interactions between the Bank Statement Creation at Bank process component 142 and the Payment Processing process component 132 in the architectural design of FIG. 1. The interactions start when a bank statement is created at a bank. The Bank Statement Creation at Bank process component 142 notifies the Payment Processing process component 132 about transactions on a bank account. In some implementations, a bank account statement can be in the format of the national electronic banking standard CBI (Corporate Banking Interbancario), established by the Italian Banking Association (ABI) and the major Italian (IT) banks.

As shown in FIG. 13, a bank statement is created at a bank and an IT_CBI Bank Account Statement Notification message 1316 with statement information is generated. The IT_CBI Bank Account Statement Notification message 1316 uses Mapping Entity 1318 to transform the IT_CBI formatted message to a Bank Account Statement Notification message 1306. The message 1306 is received in the Payment Processing process component 116 where a Create Bank Statement operation 1308 is invoked to create a bank statement. The Create Bank Statement operation 1308 is included in a Payment Processing Incoming Payment Advicing In interface 1310. A Maintain Bank Statement inbound process agent 1312 updates a House Bank Statement business object 1314 by creating a new bank statement. The House Bank Statement business object 1314 represents a legally binding notification from the house bank about the revenues items within a specific time period at a house bank account with a defined starting and closing balance.

The Bank Statement Creation at Bank process component 142 sends information to the Payment Processing process component 132 using an IT_CBI_Notify Of Bank Account Statement communication channel template 1320. The communication channel template 1320 can provide information from an external party about a bank statement.

Interactions Between Process Components "Customer Return Processing" and "Accounting"

Figure 14:
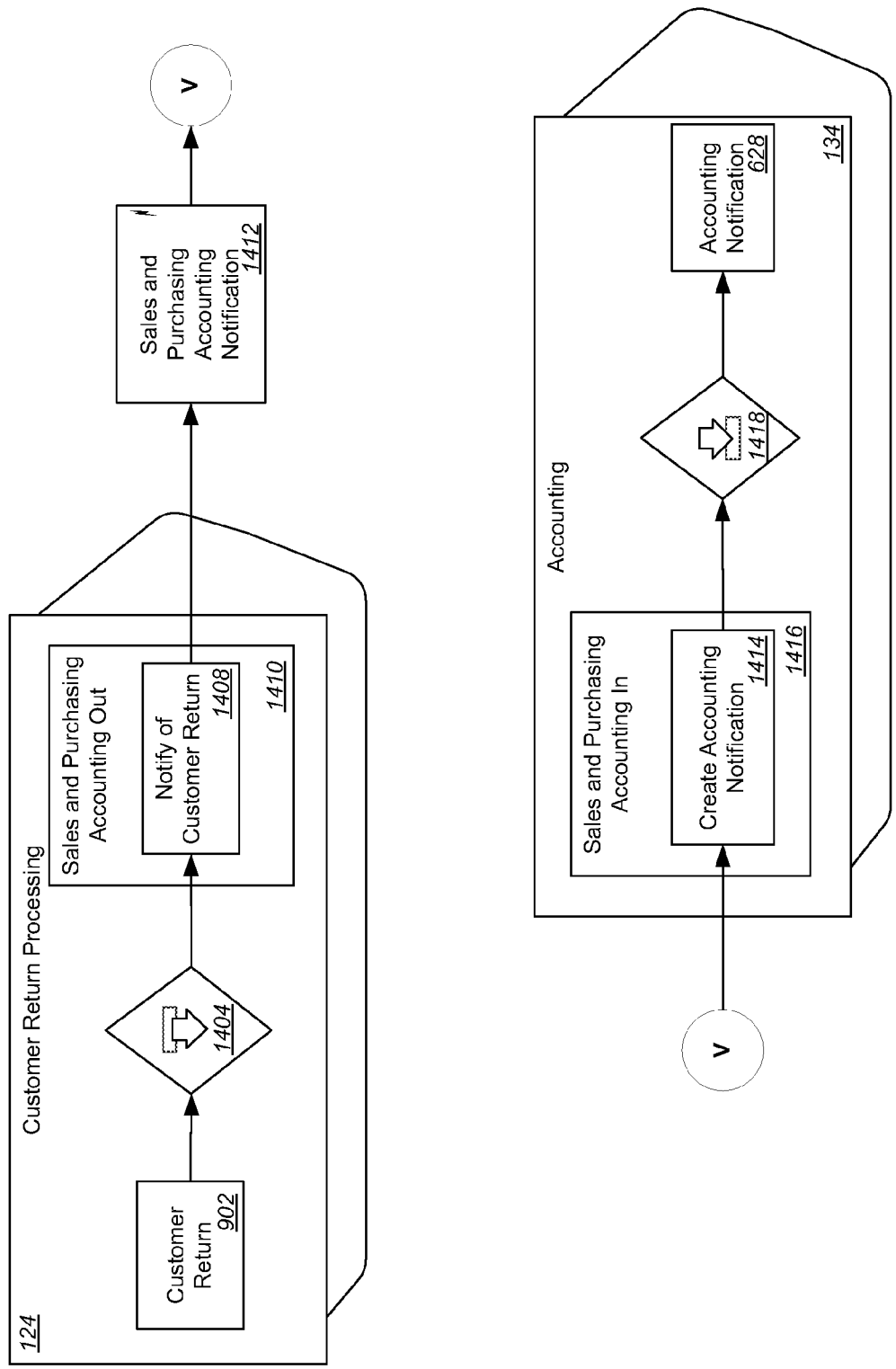
FIG. 14 is a block diagram showing interactions between the Customer Return Processing process component and the Accounting process component.

FIG. 14 is a block diagram showing interactions between the Customer Return Processing process component 124 and the Accounting process component 134 in the architectural design of FIG. 1. The interaction starts when a customer return is created or updated. The Customer Return Processing process component 124 requests the creation or update of subledger account (based on sales) from the Accounting process component 134.

As shown in FIG. 14, the Customer Return Processing process component 124 includes the Customer Return business object 902. The Customer Return business object 902 represents a request made by a customer for a seller to take back goods that have been delivered, and to cancel a sale.

The Customer Return business object 902 uses a Notify of Customer Return to Accounting outbound process agent 1404 to invoke a Notify of Customer Return operation 1408. The Notify of Customer Return operation 1408 notifies accounting about the creation, change, or cancellation of a customer return. The operation 1408 is included in a Sales and Purchasing Accounting Out interface 1410. The operation 1408 generates a Sales and Purchasing Accounting Notification message 1412.

A Create Accounting Notification operation 1414 handles the message 1412. The operation 1414 is included in a Sales and Purchasing Accounting In interface 1416. The operation 1414 receives order accounting notification from process components Service Confirmation Processing, Service Contract Processing, Service Request Processing, Service Order Processing, Purchase Order Processing and Sales Order Processing 126. The notification is to inform the Accounting process component 134 about the creation, change or deletion of any kind of order business objects. The operation 1414 uses a Maintain Subledger Account based on Sales and Purchasing inbound process agent 1418 to update the Accounting Notification business object 628. The Accounting Notification business object 628 represents a notification sent by an operational component regarding a business transaction. It represents an operational business transaction in a standardized form for all business transaction documents, and contains the data needed to valuate the business transaction.

Interactions Between Process Components "Inbound Delivery Processing" and "Customer Return Processing"

Figure 15:
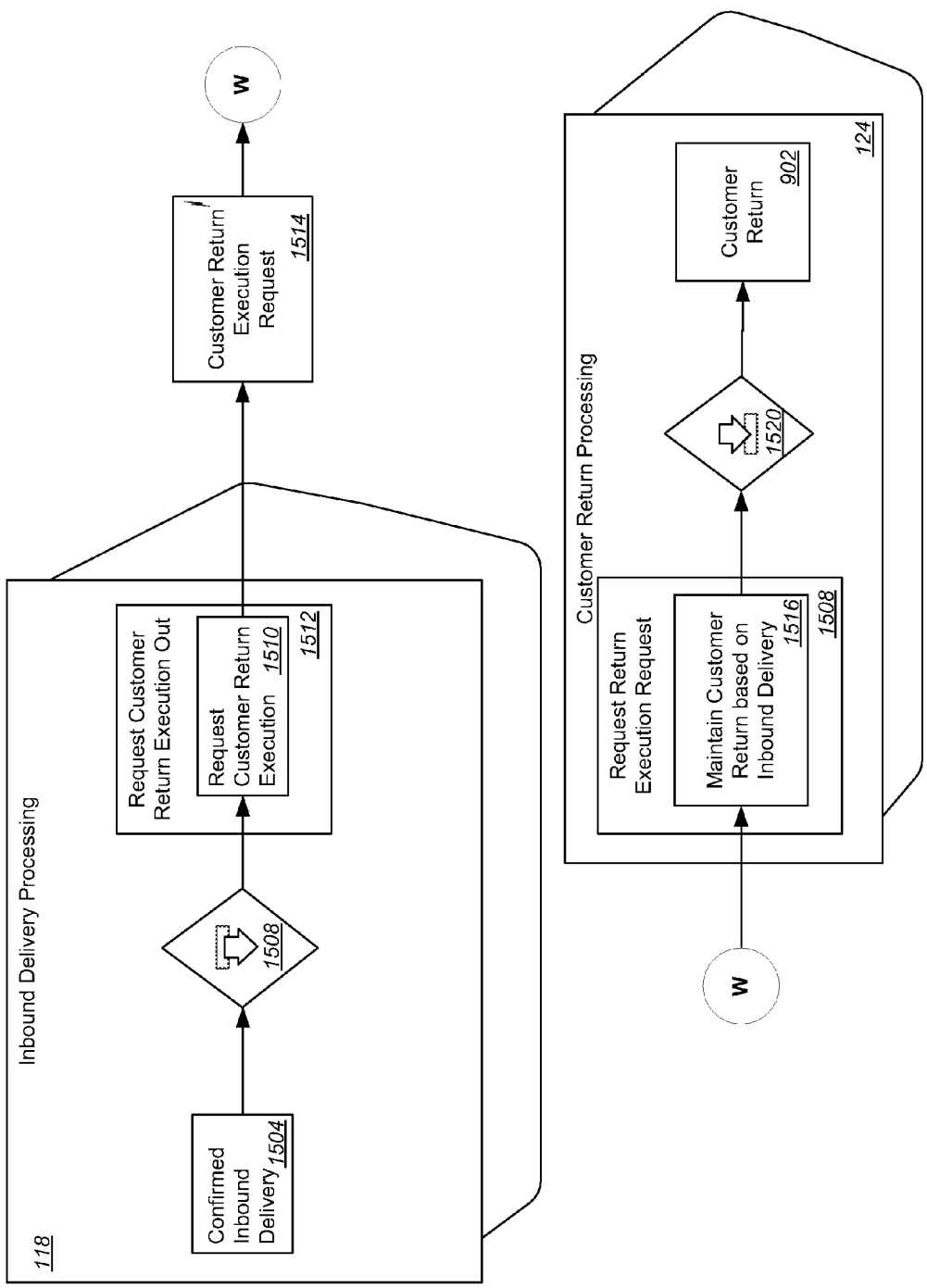
FIG. 15 is a block diagram showing interactions between an Inbound Delivery Processing process component and the Customer Return Processing process component.

FIG. 15 is a block diagram showing the interactions between the Inbound Delivery Processing process component 118 and the Customer Return Processing process component 124 in the architectural design of FIG. 1. The interaction starts when an inbound delivery (e.g., a type return) or the related confirmed inbound delivery is created. The Inbound Delivery Processing process component 118 requests the creation, update or cancellation of customer returns from the Customer Return Processing process component 124.

As shown in FIG. 15, the Inbound Delivery Processing process component 118 includes a Confirmed Inbound Delivery business object 1504. The Confirmed Inbound Delivery business object 1504 represents a clearing house forwarding payment data to an institution that issued a particular payment card. The institution can initiate the transfer of the payment amount to the house bank account of the company and returns a success status message to the clearing house.

The Confirmed Inbound Delivery business object 1504 uses a Request Customer Return Execution from Confirmed Inbound Delivery to Customer Return Processing outbound process agent 1508 to invoke a Request Customer Return Execution operation 1510. The operation 1510 is included in a Request Customer Return Execution Out interface 1512. The operation 1510 generates a Customer Return Execution Request message 1514.

A Maintain Customer Return based on Inbound Delivery operation 1516 handles the message 1514. The operation 1516 is included in a Request Return Execution Request interface 1518. The operation 1516 uses a Maintain Customer Return based on Inbound Delivery inbound process agent 1520 to update the Customer Return business object 902. The Customer Return business object 902 represents a request made by a customer for a seller to take back goods that have been delivered, and to cancel a sale.

Interactions Between Process Components "Customer Return Processing" and "Customer Invoice Processing"

Figure 16:
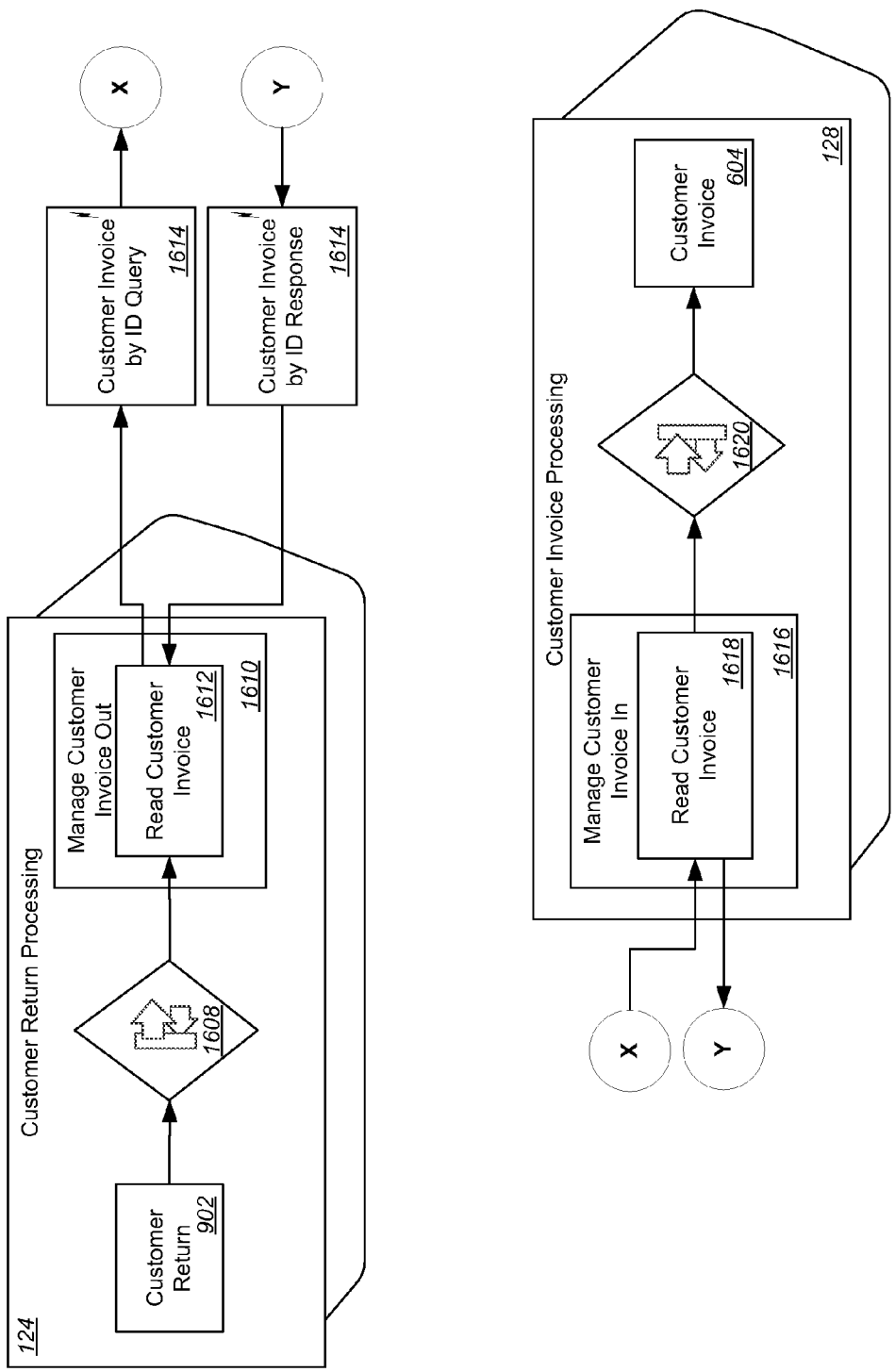
FIG. 16 is a block diagram showing an interaction between the Customer Return Processing process component and the Customer Invoice Processing process component related to requesting information about customer invoices.

FIG. 16 is a block diagram showing interactions between the Customer Return Processing process component 124 and the Customer Invoice Processing process component 128, related to requesting information about customer invoices, in the architectural design of FIG. 1. The interaction starts when a customer return is created with reference to a customer invoice. The Customer Return Processing process component 124 requests information about the customer invoice referenced from the Customer Invoice Processing process component 128. The Customer Invoice Processing process component 128 provides the requested information to the requester.

As shown in FIG. 16, the Customer Return Processing process component 124 includes the Customer Return business object 902. The Customer Return business object 902 represents a request made by a customer for a seller to take back goods that have been delivered, and to cancel a sale.

The Customer Return business object 902 uses a Synchronous Read Customer Invoice from Customer Return to Customer Invoice synchronous outbound process agent 1608 to invoke a Read Customer Invoice operation 1612. The Read Customer Invoice operation 1612 provides information about a customer invoice. The operation 1612 is included in a Manage Customer Invoice Out interface 1610. The operation 1612 generates a Customer Invoice by ID Query message 1614 and a Customer Invoice by ID Response message 1614.

A Read Customer Invoice operation 1618 handles the Customer Invoice by ID Query message 1614 and the Customer Invoice by ID Response message 1614. The operation 1618 is included in a Manage Customer Invoice In interface 1616. The operation 1618 uses a Synchronous Read Customer Invoice synchronous inbound process agent 1620 to update the Customer Invoice business object 604. The Customer Invoice business object 604 represents a binding statement of amounts receivable resulting, for example, from deliveries to a customer, services performed for a customer, adjustments to these receivables, or credit memos to a customer.

Interactions Between Process Components "Customer Invoice Processing" and "Supplier Invoice Processing at Customer"

Figure 17:
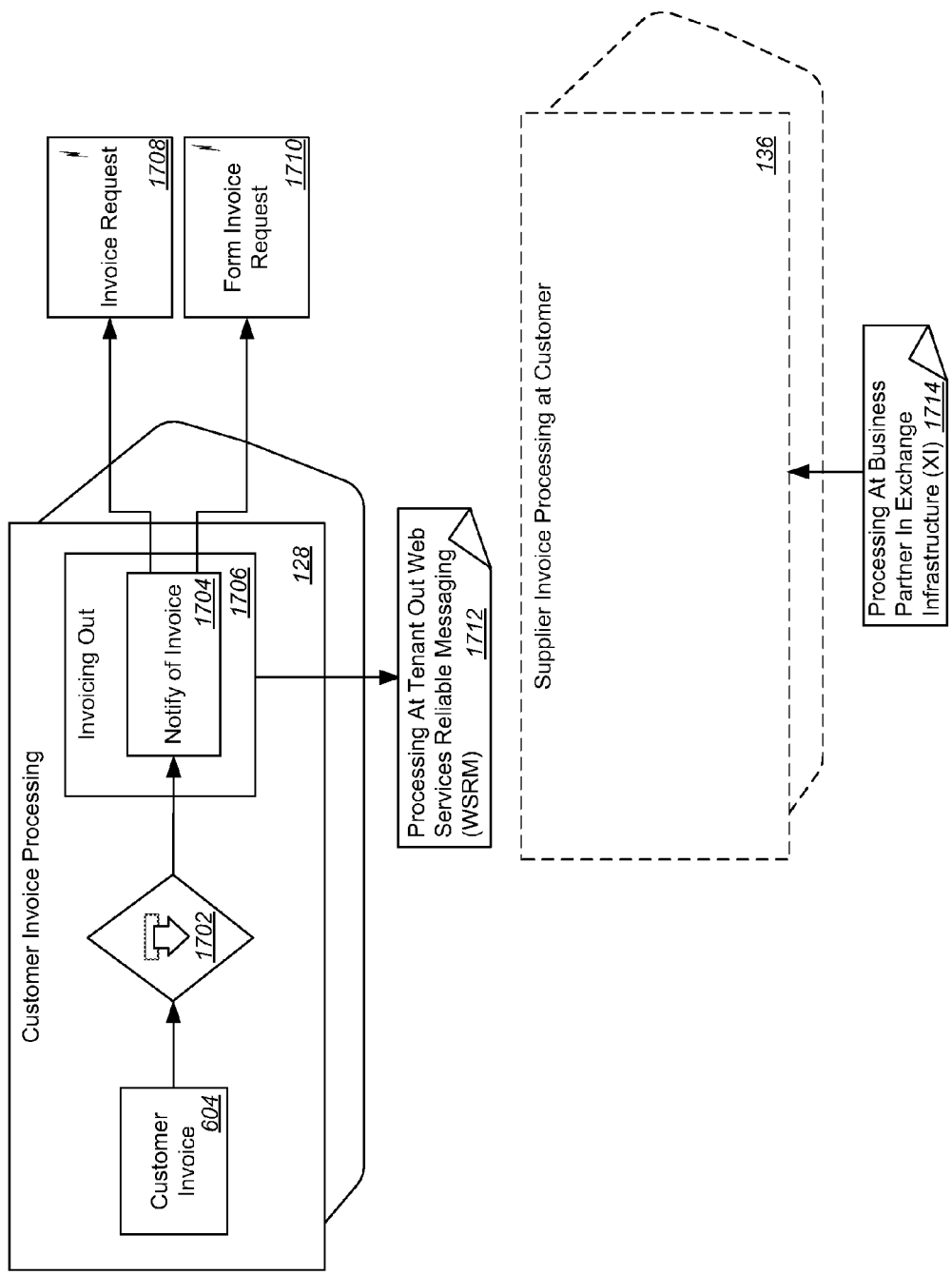
FIG. 17 is a block diagram showing interactions between the Customer Invoice Processing process component and a Supplier Invoice Processing at Customer process component.

FIG. 17 is a block diagram showing interactions between the Customer Invoice Processing process component 128 and the Supplier Invoice Processing at Customer process component 136 in the architectural design of FIG. 1. The interaction starts when a customer invoice is created or cancelled. The Customer Invoice Processing process component 128 informs the Supplier Invoice Processing process component 136 at a customer's side about the creation or cancellation of a customer invoice from the Customer Invoice Processing process component 128. The information about the customer invoice can be sent by Extensible Markup Language (XML) or form message output.

As shown in FIG. 17, the Customer Invoice Processing process component 128 includes the Customer Invoice business object 604. The Customer Invoice business object 604 represents a binding statement of amounts receivable resulting, for example, from deliveries to a customer, services performed for a customer, adjustments to these receivables, or credit memos to a customer.

The Customer Invoice business object 604 uses a Notify Customer of Customer Invoice outbound process agent 1702 to invoke a Notify of Invoice operation 1704. The operation 1704 fills a billing document with data for customer usage. The operation 1704 is included in an Invoicing Out interface 1706. The Customer Invoice Processing process component 128 sends information to the Supplier Invoice Processing at Customer process component 136 using a Processing at Tenant Out Web Services Reliable Messaging (WSRM) communication channel template 1712. The Invoicing Out interface 1706 sends information from the Supplier Invoice Processing at Customer process component 136 using the Processing At Tenant Out Web Services Reliable Messaging (WSRM) communication channel template 1712. The communication channel template 1712 can define protocols and parameters used for communication with an external party.

The Notify of Invoice operation 1704 generates an Invoice Request message 1708 or a Form Invoice Request message 1710. The messages 1708, 1710 are sent to the Supplier Invoice Processing at Customer process component 136. The Supplier Invoice Processing at Customer process component 136 receives information from the Customer Invoice Processing process component 128 using a Processing At Business Partner In Exchange Infrastructure (XI) communication channel template 1714. The communication channel template 1714 can define protocols and parameters used for communication with an external party. While XI represents Exchange Infrastructure, any similar or suitable third-party or proprietary toll may be used to perform the functions provided by or describe in relation to XI.

Interactions Between Process Components "Site Logistics Processing" and "Accounting"

Figure 18:
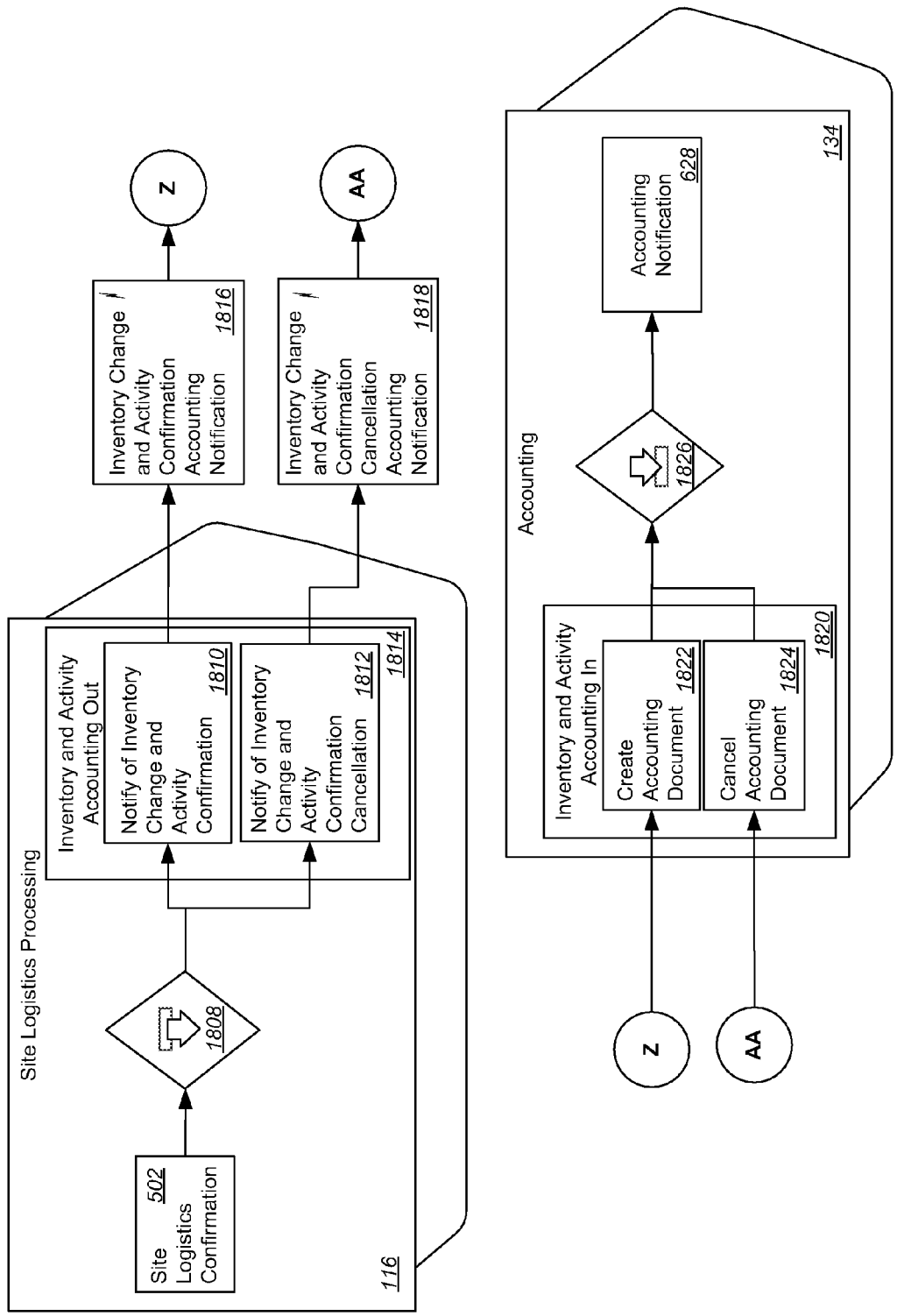
FIG. 18 is a block diagram showing interactions between the Site Logistics Processing process component and the Accounting process component.

FIG. 18 is a block diagram showing interactions between the Site Logistics Processing process component 116 and the Accounting process component 134 in the architectural design of FIG. 1. The interaction starts when a site logistics confirmation is created. The Site Logistics Processing process component 116 notifies the Accounting process component 134 of confirmed or cancelled inventory changes. The inventory changes are used to update the Accounting process component 134.

As shown in FIG. 18, the Site Logistics Processing process component 116 includes a Site Logistics Confirmation business object 502. The Site Logistics Confirmation business object 502 represents a record of confirmed logistic process changes which result from the execution of a site logistics process at a specific time (e.g., inventory changes, plan adjustments, resource utilizations, or progress status changes).

The Site Logistics Confirmation business object 502 uses a Notify of Inventory Change from Site Logistics Confirmation to Accounting outbound process agent 1808 to invoke a Notify of Inventory Change and Activity Confirmation operation 1810 or a Notify of Inventory Change and Activity Confirmation Cancellation operation 1812. Both operations 1810, 1812 are included in an Inventory and Activity Accounting Out interface 1814.

If the Notify of Inventory Change and Activity Confirmation operation 1810 is invoked, then an Inventory Change and Activity Confirmation Accounting Notification message 1816 is sent to the Accounting process component 134. If the Notify of Inventory Change and Activity Confirmation Cancellation operation 1812 is invoked, then an Inventory Change and Activity Confirmation Cancellation Accounting Notification message 1818 is sent to the Accounting process component 134.

A Create Accounting Document operation 1822 handles the Inventory Change and Activity Confirmation Accounting Notification message 1816. A Cancel Accounting Document operation 1824 handles the Inventory Change and Activity Confirmation Cancellation Accounting Notification message 1818. The operations 1822, 1824 are included in an Inventory and Activity Accounting In interface 1820. A Maintain Accounting Document based on Inventory and Activity inbound process agent 1826 is used to update the Accounting Notification business object 628. The Accounting Notification business object 628 represents a notification sent by an operational component regarding a business transaction. It represents an operational business transaction in a standardized form for all business transaction documents, and contains the data needed to valuate the business transaction.

Interactions Between Process Components "Customer Invoice Processing" and "Due Item Processing"

Figure 19:
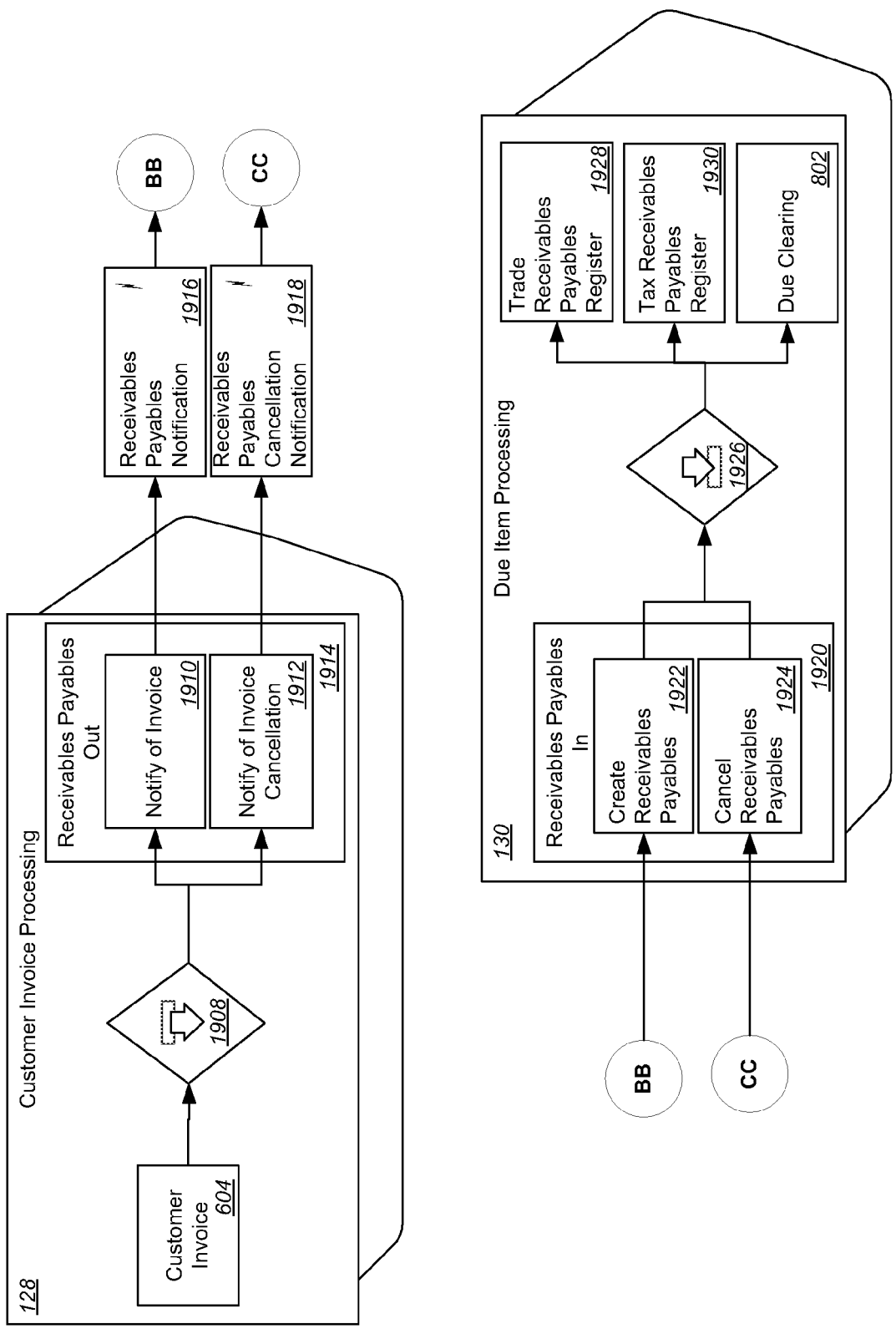
FIG. 19 is a block diagram showing interactions between the Customer Invoice Processing process component and the Due Item Processing process component.

FIG. 19 is a block diagram showing interactions between the Customer Invoice Processing process component 128 and the Due Item Processing process component 130 in the architectural design of FIG. 1. The interaction starts when a customer invoice is created or cancelled. The Customer Invoice Processing process component 128 notifies the Due Item Processing process component 130 about the creation or cancellation of a customer invoice.

As shown in FIG. 19, the Customer Invoice Processing process component 128 includes the Customer Invoice business object 604. The Customer Invoice business object 604 represents a binding statement of amounts receivable resulting, for example, from deliveries to a customer, services performed for a customer, adjustments to these receivables, or credit memos to a customer.

The Customer Invoice business object 604 uses a Notify of Customer Invoice to Due Item Processing outbound process agent 1908 to invoke a Notify of Invoice operation 1910 to inform the Due Item Processing process component 130 about a customer invoice in order to derive payment due data.

Alternatively, a Request Invoice Cancellation operation 1912 is invoked to cancel the previously sent notification for receivables/payables due. Both operations 1910, 1912 are included in a Receivables Payables Out interface 1914. If the Notify of Invoice operation 1910 is invoked, a Receivables Payables Notification message 1916 is sent to the Due Item Processing process component 130. If the Request Invoice Cancellation operation 1912 is invoked, a Receivables Payables Cancellation Request message 1918 is sent to the Due Item Processing process component 130.

A Create Receivables Payables operation 1922 handles the Receivables Payables Notification message 1916. A Cancel Receivables Payable operation 1924 handles the Receivables Payables Cancellation Notification message 1918. The operations 1916 and 1918 are included in a Receivables Payables In interface 1920.

If the message 1916 is received, then the Create Receivables Payables operation 1922 is performed to create a trade or tax receivable or payable. If the message 1918 is received, then the Cancel Receivables Payables operation 1924 is performed to cancel a trade or tax receivable or payable. The operations 1922 and 1924 use a Maintain Trade and Tax Receivables Payables inbound process agent 1926 to update one or more of three business objects: a Trade Receivables Payables Register business object 1928, a Tax Receivables Payables Register business object 1930, and the Due Clearing business object 802. The Trade Receivables Payables Register business object 1928 represents a register for all trade receivables and payables from goods and services of a company from or to its business partners. The Tax Receivables Payables Register business object 1930 represents a register of tax receivables and payables of a company that are due for delivered goods and rendered services between buyers and sellers, consumption of goods, the transfer of goods, or withheld from payments to sellers. The Due Clearing business object 802 represents a group of receivables and payables for clearing.

Interactions Between Process Components "Customer Invoice Processing" and "Balance of Foreign Payment Management"

Figure 20:
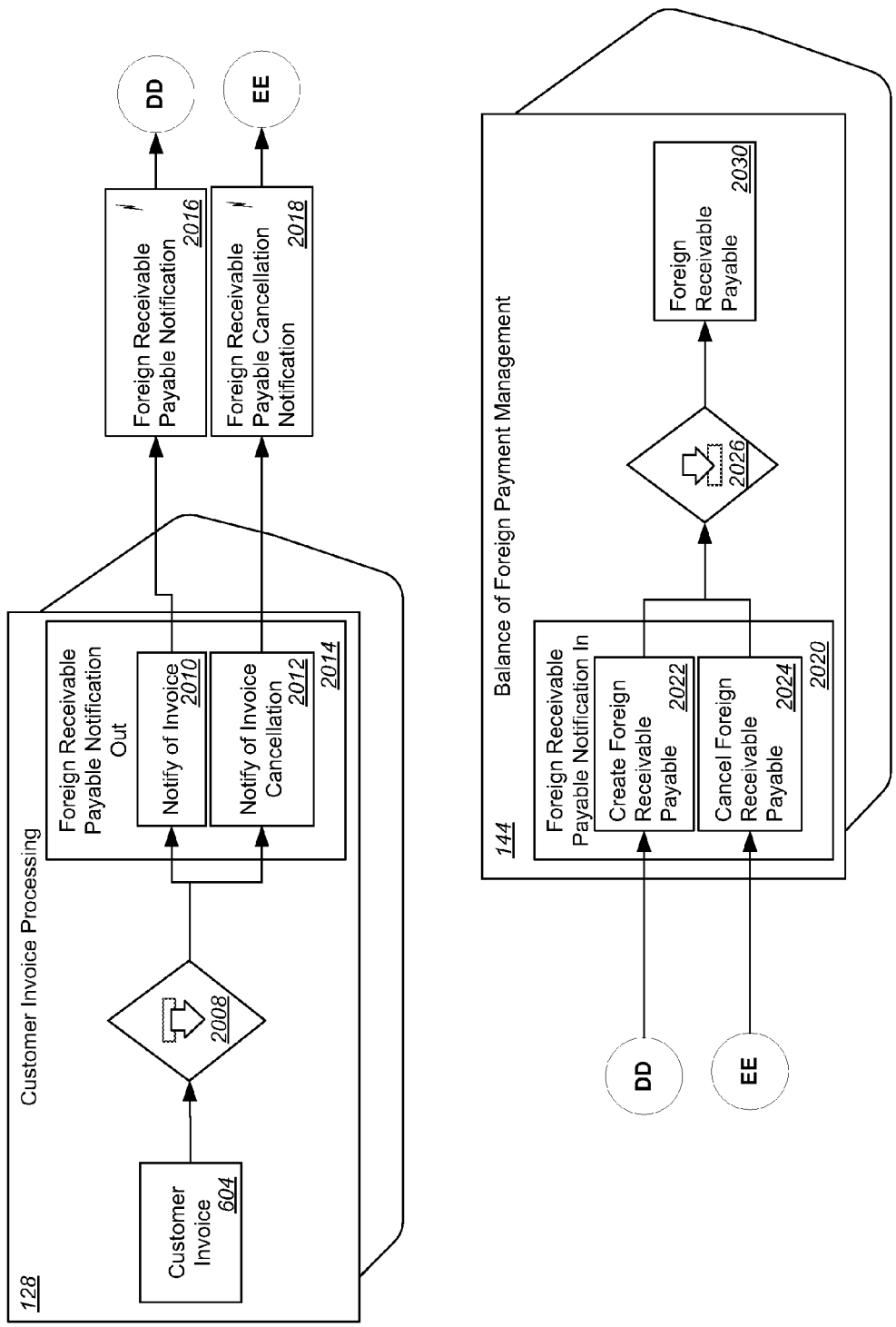
FIG. 20 is a block diagram showing interactions between the Customer Invoice Processing process component and a Balance of Foreign Payment Management Due Item Processing process component.

FIG. 20 is a block diagram showing interactions between the Customer Invoice Processing process component 128 and the Balance of Foreign Payment Management process component 144 in the architectural design of FIG. 1. The interaction starts when a customer invoice is created or cancelled related to a non-resident buyer. The Customer Invoice Processing process component 128 notifies the Balance of Foreign Payment Management process component 144 about the creation or cancellation of the customer invoice.

As shown in FIG. 20, the Customer Invoice Processing process component 128 includes the Customer Invoice business object 604. The Customer Invoice business object 604 represents a binding statement of amounts receivable resulting, for example, from deliveries to a customer, services performed for a customer, adjustments to these receivables, or credit memos to a customer.

The Customer Invoice business object 604 uses a Notify of Customer Invoice to Balance of Foreign Payments Management outbound process agent 2008 to transfer the customer invoice to the Balance of Foreign Payment Management process component 144, where the receivables to, or payables from, non-residential business partners are tracked. The agent 2008 invokes a Notify of Invoice operation 2010 to inform about the invoice in order to track receivable from, or payable to, a non-resident business partner. Alternatively, a Notify of Invoice Cancellation operation 2012 is invoked to inform about cancellation of the invoice in order to also cancel information about receivable from, or payable to, non-resident business partner. Both operations 2010, 2012 are included in a Foreign Receivable Payable Notification Out interface 2014. If the Notify of Invoice operation 2010 is invoked, a Foreign Receivable Payable Notification message 2016 is sent to the Balance of Foreign Payment Management process component 144. If the Request Invoice Cancellation operation 2012 is invoked, a Foreign Receivable Payable Cancellation Notification message 2018 is sent to the Balance of Foreign Payment Management process component 144.

A Create Receivables Payables operation 2022 handles the Foreign Receivable Payable Notification message 2016. A Cancel Receivables Payable operation 2024 handles the Foreign Receivable Payable Cancellation Notification message 2018. The operations 2016, 2018 are included in a Foreign Receivable Payable Notification In interface 2020.

If the message 2016 is received, then the Create Foreign Receivable Payable operation 2022 is performed to create a foreign receivable or payable. If the message 2018 is received, then the Cancel Foreign Receivable Payable operation 2024 is performed to cancel a foreign receivable or payable. The operations 2022, 2024 use a Maintain Foreign Receivable Payable inbound process agent 2026 to update a Foreign Receivable Payable business object 2030. The Foreign Receivable Payable business object 2030 represents a receivable from, or payable to, a non-resident business partner. The agent 2026 creates, changes or cancels a foreign receivable or payable.

Interactions Between Process Components "Site Logistics Processing" and "Site Logistics Processing"

Figure 21:
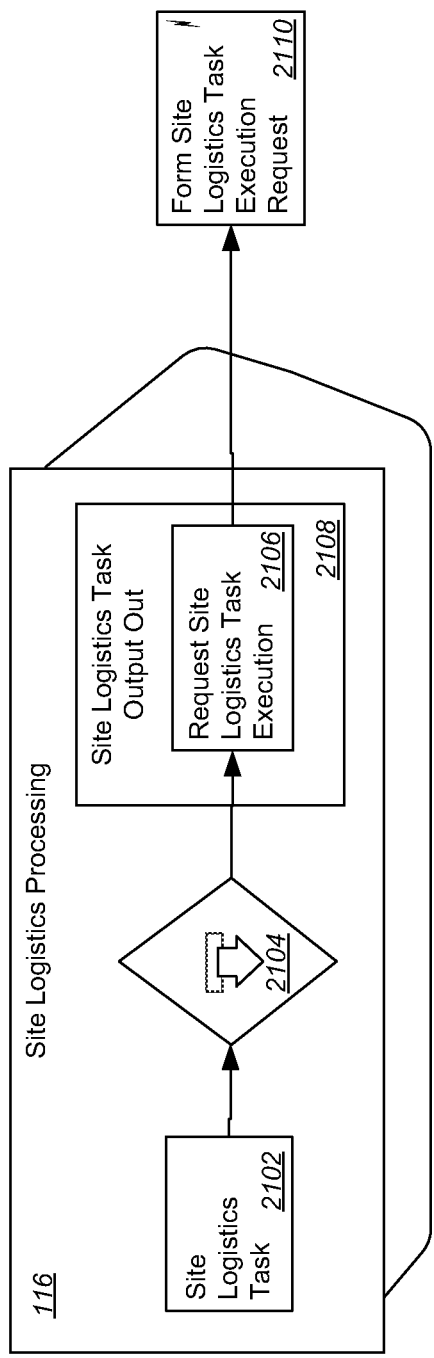
FIG. 21 is a block diagram showing interactions within the Site Logistics Processing process component.

FIG. 21 is a block diagram showing interactions within the Site Logistics Processing process component 116 in the architectural design of FIG. 1.

As shown in FIG. 21, the Site Logistics Processing process component 116 includes a Site Logistics Task business object 2102. The Site Logistics Task business object 2102 represents a task for executing a logistics operation or activity within a site. For example, the Site Logistics Task business object 2102 represents a piece of work to be performed by a person or an automated system.

The Site Logistics Task business object 2102 uses a Request Site Logistics Task Execution for Output outbound process agent 2104 to request printing of a site logistics task list. The Request Site Logistics Task Execution for Output outbound process agent 2104 invokes a Request Site Logistics Task Execution operation 2106 in a Site Logistics Task Output Out interface 2108. For example, the operation 2106 requests the printing of site logistics task instructions. The Request Site Logistics Task Execution operation 2106 sends a Form Site Logistics Task Execution Request message 2110.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, computer-readable medium, the instructions being structured as process components interacting with each other through service interfaces, the instructions operable when executed by at least one processor to:

define a plurality of process components, each of the process components comprising a modular and application-independent package of reusable, granular software implementing a respective and distinct business process, the business process comprising functionality exposed by the process component via a corresponding service interface, the plurality of process components including:

a site logistics processing process component that handles the preparation, physical execution, and confirmation of logistics processes within a site, the logistics processes being based on site logistics process models and including picking, packing, shipping, receiving, and value-added services;

an inbound delivery processing process component that handles the management and processing of the inbound delivery requirements for received goods from a vendor, the process component combining document-based tasks for the inbound delivery process and enabling communications regarding the originating document and invoicing with the vendor;

an inventory processing process component that handles the management of inventory and recording of inventory changes, providing services to maintain current stock, content and structure of logistic units and allocations;

a supply and demand matching process component that handles the management of all the tasks necessary to ensure that sufficient material receipt elements exist to cover material demand while taking available capacity into account;

a customer return processing process component that handles the processing of requests made by customers to a seller to take back goods that were delivered, and to reverse a sale;

a sales order processing process component that handles the processing of customers' requests to seller for the delivery of goods, on a specific date, for a specific quantity, and for a specific price; and an accounting process component that represents relevant business transactions for valuation and profitability analysis; and define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the site logistics processing process component and the supply and demand matching process component, where the pair-wise interaction between the site logistics processing process component and the supply and demand matching process component includes the transmission of:

a logistics confirmation inventory change notification message from the site logistics processing process component to the supply and demand matching process component, the logistics confirmation inventory change notification message comprising a notification of one or more confirmed logistics process changes resulting from execution of a site logistics process at a specific time;

the inventory processing process component and the supply and demand matching process component, where the pair-wise interaction between the inventory processing process component and the supply and demand matching process component includes the transmission of:

a planning view of inventory reconciliation notification message from the inventory processing process component to the supply and demand matching process component, the planning view of inventory reconciliation notification message comprising an inventory reconciliation update to the supply and demand matching process component;

the customer return processing process component and the accounting process component, where the pair-wise interaction between the customer return processing process component and the accounting process component includes the transmission of:

a sales and purchasing accounting notification message from the customer return processing process component to the accounting process component, the sales and purchasing accounting notification message comprising a notification to accounting regarding creation, change, or cancellation of a customer return;

the inbound delivery processing process component and the customer return processing process component, where the pair-wise interaction between the customer return processing process component and the accounting process component includes the transmission of:

a customer return execution request message from the inbound delivery processing process component to the customer return processing process component, the customer return execution request message comprising a request made by a customer for a seller to take back goods that have been delivered and to cancel a sale; and the site logistics processing process component and the accounting process component, where the pair-wise interaction between the site logistics processing process component and the accounting process component includes the transmission of:

an inventory change and activity confirmation accounting notification message from the site logistics processing process component to the accounting process component, the inventory change and activity confirmation accounting notification message comprising a notification of confirmed logistics process changes resulting from execution of a site logistics process at a specific time; and an inventory change and activity confirmation cancellation accounting notification message from the site logistics processing process component to the accounting process component, the inventory change and activity confirmation cancellation accounting notification message comprising notification of a cancelled inventory change and activity confirmation accounting notification message.

2. The product of claim 1, wherein:

the plurality of process components further includes:

a customer invoice processing process component that handles the invoicing of customers for the delivery of goods or the provision of services;

a due item processing process component that handles the collection, management, and monitoring of trade receivables or payables and corresponding sales tax or withholding tax;

a balance of foreign payment management process component that handles the collection, processing and reporting of receivables and payables according to foreign trade regulations that are required by the central banks to create the balance of payments of a country; and a payment processing process component that handles the processing and management of all payments; and the pair-wise interactions between pairs of the process components further include interactions between:

the payment processing process component and a payment processing at business partner process component;

the payment processing process component and the due item processing process component;

the customer invoice processing process component and the accounting process component;

the due item processing process component and the payment processing process component;

the due item processing process component and the accounting process component;

the customer return processing process component and the customer invoice processing process component related to requesting the creation, update or cancellation of invoices;

the payment processing process component and the accounting process component;

the payment processing process component and a payment order processing at house bank process component;

a bank statement creation at bank process component and the payment processing process component;

the customer return processing process component and the customer invoice processing process component related to requesting information about customer invoices;

the customer invoice processing process component and a supplier invoice processing at customer process component;

the customer invoice processing process component and the due item processing process component; and the customer invoice processing process component and the balance of foreign payment management due item processing process component.

3. The product of claim 1, wherein:

each of the plurality of process components is assigned to exactly one deployment unit among multiple deployment units, and each deployment unit is deployable on a separate computer hardware platform independent of every other deployment unit; and all interaction between a process component in one deployment unit and any other process component in any other deployment unit takes place through the respective service interfaces of the two process components.

4. The product of claim 3, wherein the deployment units comprise:

a production and site logistics execution deployment unit that includes the site logistics processing process component, the inbound delivery processing process component, and the inventory processing process component;

a supply chain control deployment unit that includes the supply and demand matching process component;

a customer relationship management deployment unit that includes the customer return processing process component and the sales order processing process component;

a customer invoicing deployment unit that includes the customer invoice processing process component;

a due item management deployment unit that includes the due item processing process component and a balance of foreign payment management process component;

a payment deployment unit that includes the payment processing process component; and a financial accounting deployment unit that includes the accounting process component.

5. The product of claim 1, wherein:

each of the process components includes one or more business objects; and none of the business objects of any one of the process components interacts directly with any of the business objects included in any of the other process components.

6. The product of claim 5, wherein the business objects comprise a business process object.

7. The product of claim 5, wherein none of the business objects included in any one of the process components is included in any of the other process components.

8. The product of claim 1, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

9. The product of claim 8, wherein each inbound process agent comprises a first inbound process agent operable to start an execution of a business process step requested in a first inbound message by creating or updating at least one business object instance.

10. The product of claim 8, wherein the outbound process agents comprise a first asynchronous outbound process agent that is called after a business object that is associated with the first outbound process agent changes.

11. The product of claim 1, wherein the operations comprise synchronous and asynchronous operations.

12. A system, comprising:

a computer system comprising at least one hardware platform for executing computer instructions, the computer instructions structured as a plurality of process components interacting with each other through service interfaces, each hardware platform including at least one processor for executing the computer instructions;

at least one memory storing a plurality of process components executable by the respective processor of the particular hardware platform, each of the process components comprising a modular and application-independent package of reusable granular software implementing a respective and distinct business process, the business process comprising functionality exposed by the process component via at least one service interface, the plurality of process components including:

a site logistics processing process component that handles the preparation, physical execution, and confirmation of logistics processes within a site, the logistics processes being based on site logistics process models and including picking, packing, shipping, receiving, and value added services;

an inbound delivery processing process component that handles the management and processing of the inbound delivery requirements for received goods from a vendor, the process component combining document-based tasks for the inbound delivery process and enabling communications regarding the originating document and invoicing with the vendor;

an inventory processing process component that handles the management of inventory and recording of inventory changes, providing services to maintain current stock, content and structure of logistic units and allocations;

a supply and demand matching process component that handles the management of all the tasks necessary to ensure that sufficient material receipt elements exist to cover material demand while taking available capacity into account;

a customer return processing process component that handles the processing of requests made by customers to a seller to take back goods that were delivered, and to reverse a sale;

a sales order processing process component that handles the processing of customers' requests to seller for the delivery of goods, on a specific date, for a specific quantity, and for a specific price; and an accounting process component that represents relevant business transactions for valuation and profitability analysis; and the memory further storing a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the site logistics processing process component and the supply and demand matching process component, where the pair-wise interaction between the site logistics processing process component and the supply and demand matching process component includes the transmission of:

a logistics confirmation inventory change notification message from the site logistics processing process component to the supply and demand matching process component, the logistics confirmation inventory change notification message comprising a notification of one or more confirmed logistics process changes resulting from execution of a site logistics process at a specific time;

the inventory processing process component and the supply and demand matching process component, where the pair-wise interaction between the inventory processing process component and the supply and demand matching process component includes the transmission of:

a planning view of inventory reconciliation notification message from the inventory processing process component to the supply and demand matching process component, the planning view of inventory reconciliation notification message comprising an inventory reconciliation update to the supply and demand matching process component;

the customer return processing process component and the accounting process component, where the pair-wise interaction between the customer return processing process component and the accounting process component includes the transmission of:

a sales and purchasing accounting notification message from the customer return processing process component to the accounting process component, the sales and purchasing accounting notification message comprising a notification to accounting regarding creation, change, or cancellation of a customer return;

the inbound delivery processing process component and the customer return processing process component, where the pair-wise interaction between the customer return processing process component and the accounting process component includes the transmission of:

a customer return execution request message from the inbound delivery processing process component to the customer return processing process component, the customer return execution request message comprising a request made by a customer for a seller to take back goods that have been delivered and to cancel a sale; and the site logistics processing process component and the accounting process component, where the pair-wise interaction between the site logistics processing process component and the accounting process component includes the transmission of:

an inventory change and activity confirmation accounting notification message from the site logistics processing process component to the accounting process component, the inventory change and activity confirmation accounting notification message comprising a notification of confirmed logistics process changes resulting from execution of a site logistics process at a specific time; and an inventory change and activity confirmation cancellation accounting notification message from the site logistics processing process component to the accounting process component, the inventory change and activity confirmation cancellation accounting notification message comprising notification of a cancelled inventory change and activity confirmation accounting notification message.

13. The system of claim 12, wherein:
the plurality of process components further includes:
a customer invoice processing process component that handles the invoicing of customers for the delivery of goods or the provision of services;
a due item processing process component that handles the collection, management, and monitoring of trade receivables or payables and corresponding sales tax or withholding tax;
a balance of foreign payment management process component that handles the collection, processing and reporting of receivables and payables according to foreign trade regulations that are required by the central banks to create the balance of payments of a country; and
a payment processing process component that handles the processing and management of all payments; and
the pair-wise interactions between pairs of the process components include interactions between:
the payment processing process component and a payment processing at business partner process component;
the payment processing process component and the due item processing process component;
the customer invoice processing process component and the accounting process component;
the due item processing process component and the payment processing process component;
the due item processing process component and the accounting process component;
the customer return processing process component and the customer invoice processing process component related to requesting the creation, update or cancellation of invoices;
the payment processing process component and the accounting process component;
the payment processing process component and a payment order processing at house bank process component;
a bank statement creation at bank process component and the payment processing process component;

the customer return processing process component and the customer invoice processing process component related to requesting information about customer invoices;

the customer invoice processing process component and a supplier invoice processing at customer process component;

the customer invoice processing process component and the due item processing process component; and the customer invoice processing process component and the balance of foreign payment management due item processing process component.

14. The system of claim 12, wherein:

each of the process components includes one or more business objects; and none of the business objects of any one of the process components interacts directly with any of the business objects included in any of the other process components.

15. The system of claim 12, wherein none of the business objects included in any one of the process components is included in any of the other process components.

16. The system of claim 12, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

17. The system of claim 12, the system comprising multiple hardware platforms, wherein:

the site logistics processing process component, the inbound delivery processing process component, and the inventory processing process component are deployed on a first hardware platform;

the supply and demand matching process component is deployed on a second hardware platform;

the customer return processing process component and the sales order processing process component are deployed on a third hardware platform;

the customer invoice processing process component is deployed on a fourth hardware platform;

the due item processing process component and the balance of foreign payment management process component are deployed on a fifth hardware platform;

the payment processing process component is deployed on a sixth hardware platform; and the accounting process component is deployed on a seventh hardware platform.

18. The system of claim 17, wherein each of the first through the seventh hardware platforms are distinct and separate from each other.

19. A method for developing a computer software application, comprising:

obtaining in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable granular software implementing a respective and distinct business process, the business process comprising functionality exposed by the process component, and the design further specifying a set of process component interactions based on messages transmitted between two or more of the process components, wherein:

the specified process components include:

a site logistics processing process component, executed by a computer, that handles the preparation, physical execution, and confirmation of logistics processes within a site, the logistics processes being based on site logistics process models and including picking, packing, shipping, receiving, and value-added services;

an inbound delivery processing process component, executed by a computer, that handles the management and processing of the inbound delivery requirements for received goods from a vendor, the process component combining document-based tasks for the inbound delivery process and enabling communications regarding the originating document and invoicing with the vendor;

an inventory processing process component, executed by a computer, that handles the management of inventory and recording of inventory changes, providing services to maintain current stock, content and structure of logistic units and allocations;

a supply and demand matching process component, executed by a computer, that handles the management of all the tasks necessary to ensure that sufficient material receipt elements exist to cover material demand while taking available capacity into account;

a customer return processing process component, executed by a computer, that handles the processing of requests made by customers to a seller to take back goods that were delivered, and to reverse a sale;

a sales order processing process component, executed by a computer, that handles the processing of customers' requests to a seller for the delivery of goods, on a specific date, for a specific quantity, and for a specific price; and an accounting process component, executed by a computer, that represents relevant business transactions for valuation and profitability analysis; and the process component interactions include interactions between:

the site logistics processing process component and the supply and demand matching process component, where the pair-wise interaction between the site logistics processing process component and the supply and demand matching process component includes the transmission of:

a logistics confirmation inventory change notification message from the site logistics processing process component to the supply and demand matching process component, the logistics confirmation inventory change notification message comprising a notification of one or more confirmed logistics process changes resulting from execution of a site logistics process at a specific time;

the inventory processing process component and the supply and demand matching process component, where the pair-wise interaction between the inventory processing process component and the supply and demand matching process component includes the transmission of:

a planning view of inventory reconciliation notification message from the inventory processing process component to the supply and demand matching process component, the planning view of inventory reconciliation notification message comprising an inventory reconciliation update to the supply and demand matching process component;

the customer return processing process component and the accounting process component, where the pair-wise interaction between the customer return processing process component and the accounting process component includes the transmission of:
- a sales and purchasing accounting notification message from the customer return processing process component to the accounting process component, the sales and purchasing accounting notification message comprising a notification to accounting regarding creation, change, or cancellation of a customer return;

the inbound delivery processing process component and the customer return processing process component, where the pair-wise interaction between the customer return processing process component and the accounting process component includes the transmission of:
- a customer return execution request message from the inbound delivery processing process component to the customer return processing process component, the customer return execution request message comprising a request made by a customer for a seller to take back goods that have been delivered and to cancel a sale; and the site logistics processing process component and the accounting process component, where the pair-wise interaction between the site logistics processing process component and the accounting process component includes the transmission of:
- an inventory change and activity confirmation accounting notification message from the site logistics processing process component to the accounting process component, the inventory change and activity confirmation accounting notification message comprising a notification of confirmed logistics process changes resulting from execution of a site logistics process at a specific time; and
- an inventory change and activity confirmation cancellation accounting notification message from the site logistics processing process component to the accounting process component, the inventory change and activity confirmation cancellation accounting notification message comprising notification of a cancelled inventory change and activity confirmation accounting notification message; and generating, by using the at least one processor on the computer system, a computer software application to perform the set of processes based on the obtained design including the specified process components and the specified process component interactions.

20. The method of claim 19, wherein:
the specified process components further include:
- a customer invoice processing process component that handles the invoicing of customers for the delivery of goods or the provision of services;
- a due item processing process component that handles the collection, management, and monitoring of trade receivables or payables and corresponding sales tax or withholding tax;
- a balance of foreign payment management process component that handles the collection, processing and reporting of receivables and payables according to foreign trade regulations that are required by the central banks to create the balance of payments of a country; and
- a payment processing process component that handles the processing and management of all payments; and the process component interactions further include interactions between:
- the payment processing process component and a payment processing at business partner process component;
- the payment processing process component and the due item processing process component;
- the customer invoice processing process component and the accounting process component;
- the due item processing process component and the payment processing process component;
- the due item processing process component and the accounting process component;
- the customer return processing process component and the customer invoice processing process component related to requesting the creation, update or cancellation of invoices;
- the payment processing process component and the accounting process component;
- the payment processing process component and a payment order processing at house bank process component;
- a bank statement creation at bank process component and the payment processing process component;
- the customer return processing process component and the customer invoice processing process component related to requesting information about customer invoices;
- the customer invoice processing process component and a supplier invoice processing at customer process component;
- the customer invoice processing process component and the due item processing process component; and
- the customer invoice processing process component and the balance of foreign payment management due item processing process component.

21. The method of claim 19, wherein each process in the set of processes is a business process transforming a defined business input into a defined business outcome.

22. The method of claim 21, wherein obtaining digital data representing the architectural design further comprises editing the design before using the design.

* * * * *